(12) United States Patent
Park et al.

(10) Patent No.: US 10,823,958 B2
(45) Date of Patent: Nov. 3, 2020

(54) ELECTRONIC DEVICE FOR ENCODING OR DECODING FRAMES OF VIDEO AND METHOD FOR CONTROLLING THEREOF

(71) Applicant: Samsung Electronics Co., Ltd., Gyeonggi-do (KR)

(72) Inventors: Chan-Yul Park, Gyeonggi-do (KR); Han-Sang Kim, Seoul (KR); Bong-Soo Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 229 days.

(21) Appl. No.: 15/668,367

(22) Filed: Aug. 3, 2017

(65) Prior Publication Data

US 2018/0081171 A1    Mar. 22, 2018

(30) Foreign Application Priority Data

Sep. 21, 2016  (KR) .................. 10-2016-0120821

(51) Int. Cl.

| | |
|---|---|
| *G06F 3/01* | (2006.01) |
| *G02B 27/00* | (2006.01) |
| *H04N 19/89* | (2014.01) |
| *H04N 19/102* | (2014.01) |
| *H04N 19/139* | (2014.01) |
| *H04N 19/164* | (2014.01) |
| *H04N 19/17* | (2014.01) |
| *H04N 19/176* | (2014.01) |

(Continued)

(52) U.S. Cl.

CPC ....... *G02B 27/0093* (2013.01); *G02B 27/017* (2013.01); *G06F 3/012* (2013.01); *G06F 3/013* (2013.01); *H04N 19/102* (2014.11); *H04N 19/134* (2014.11); *H04N 19/139* (2014.11); *H04N 19/164* (2014.11); *H04N 19/17* (2014.11); *H04N 19/176* (2014.11); *H04N 19/46* (2014.11); *H04N 19/51* (2014.11); *H04N 19/597* (2014.11); *H04N 19/89* (2014.11); *H04N 19/895* (2014.11); *G02B 2027/0138* (2013.01); *G02B 2027/0187* (2013.01)

(58) Field of Classification Search

CPC .......... G06F 3/011; G06F 3/017; G06F 3/012

See application file for complete search history.

(56) References Cited

U.S. PATENT DOCUMENTS

| | | |
|---|---|---|
| 9,063,330 B2 | 6/2015 | LaValle et al. |
| 2013/0121602 A1 | 5/2013 | Azukizawa |

(Continued)

FOREIGN PATENT DOCUMENTS

JP    5779483    9/2015

*Primary Examiner* — Sanghyuk Park

(74) *Attorney, Agent, or Firm* — The Farrell Law Firm, P.C.

(57) ABSTRACT

A control method of an electronic device, an electronic device, and a control method of an electronic device that performs encoding are provided. The control method of the electronic device includes obtaining a video, determining a part corresponding to a user gaze on a first frame in the first frame of the video, determining a decoding-target part, which includes the part corresponding to the user gaze on the first frame and has a size greater than or equal to the part corresponding to the user gaze on the first frame, decoding the decoding-target part, and displaying an image of the part corresponding to the user gaze on the first frame among the decoding-target part.

16 Claims, 39 Drawing Sheets

(51) Int. Cl.
*H04N 19/46* (2014.01)
*H04N 19/134* (2014.01)
*H04N 19/51* (2014.01)
*H04N 19/597* (2014.01)
*H04N 19/895* (2014.01)
*G02B 27/01* (2006.01)

(56) References Cited

U.S. PATENT DOCUMENTS

2013/0169530 A1* 7/2013 Bhaskar .................. G06F 3/012
　　　　　　　　　　　　　　　　　　　　　　　　　345/157
2015/0249813 A1　　 9/2015 Cole et al.
2017/0302918 A1* 10/2017 Mammou ............ H04N 19/103
2017/0302972 A1* 10/2017 Zhang ................ H04N 21/2343

* cited by examiner

ELECTRONIC DEVICE FOR ENCODING OR DECODING FRAMES OF VIDEO AND METHOD FOR CONTROLLING THEREOF

PRIORITY

This application claims priority under 35 U.S.C. § 119(a) to a Korean Patent Application filed on Sep. 21, 2016 in the Korean Intellectual Property Office and assigned Serial No. 10-2016-0120821, the entire content of which is incorporated herein by reference.

BACKGROUND

1. Field of the Disclosure

The present disclosure relates generally to an electronic device that displays an image, and a control method thereof, and more particularly, to an electronic device that is capable of decoding a part of an entire image, and a control method thereof.

2. Description of the Related Art

Some electronic devices are wearable. Such electronic devices may be referred to as wearable devices. Types of electronic devices that may be worn may include a head-mounted electronic device, such as a head mounted display (HMD).

An HMD device may be worn on a user's body (e.g., the head of a user) and may provide the user with a virtual reality environment or an augmented reality environment. Providing a virtual reality environment may include, for example, providing a display of a screen which may embody virtual reality and various user interfaces which may embody the virtual reality, or the like.

A conventional HMD may sense acceleration, angular acceleration, or the direction of a tilt, and may display a screen based on the sensing information. Accordingly, an HMD may change and display a screen based on a movement of a user, and the user may be provided with a service with a sense of reality by viewing the changed screen.

A conventional electronic device may store a wide-angle image including various gazes, and may display a part corresponding to a current user gaze. A conventional electronic device may decode an entire wide-angle image to display a part corresponding to a current user gaze. Since a wide-angle image includes information associated with the directions of 360 degrees in three dimensions, the wide-angle image may have a somewhat high capacity, if compared to a normal two-dimensional (2D) image. For example, to display a virtual reality environment which is similar to actual reality, the wide-angle image may be a high-quality image. Accordingly, it takes a relatively longer time for an electronic device to decode an entire wide-angle image, and a relatively greater amount of resources may be required.

SUMMARY

An aspect of the present disclosure provides an electronic device that is capable of decoding a part of an entire image, and a control method thereof. According to an aspect of the present disclosure, there is provided a control method of an electronic device. The method includes obtaining a video; determining a part corresponding to a user gaze on a first frame in the first frame of the video; determining a decoding-target part, which includes the part corresponding to the user gaze on the first frame and has a size greater than or equal to the part corresponding to the user gaze on the first frame; decoding the decoding-target part; and displaying an image of the part corresponding to the user gaze on the first frame among the decoding-target part.

According to another aspect of the present disclosure, there is provided an electronic device. The electronic device includes a display; and a processor, wherein the processor is configured to obtain a video; determine a part corresponding to a user gaze on a first frame, in the first frame of the video; determine a decoding-target part, which includes the part corresponding to the user gaze on the first frame and has a size greater than or equal to the part corresponding to the user gaze on the first frame; decode the decoding-target part; and display, on the display, an image associated with the part corresponding to the user gaze on the first frame among the decoding target part.

According to another aspect of the present disclosure, there is provided a control method of an electronic device that performs encoding. The method includes obtaining a video including a wide-angle image for providing a virtual reality service; receiving information associated with a current user gaze from an electronic device that performs decoding; determining a part corresponding to a user gaze on a first frame using the current user gaze, from the first frame of the video; determining an encoding-target part, which includes the part corresponding to the user gaze on the first frame and has a size greater than or equal to the part corresponding to the user gaze on the first frame; encoding the encoding-target part; and transmitting encoded data to the electronic device that performs decoding.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
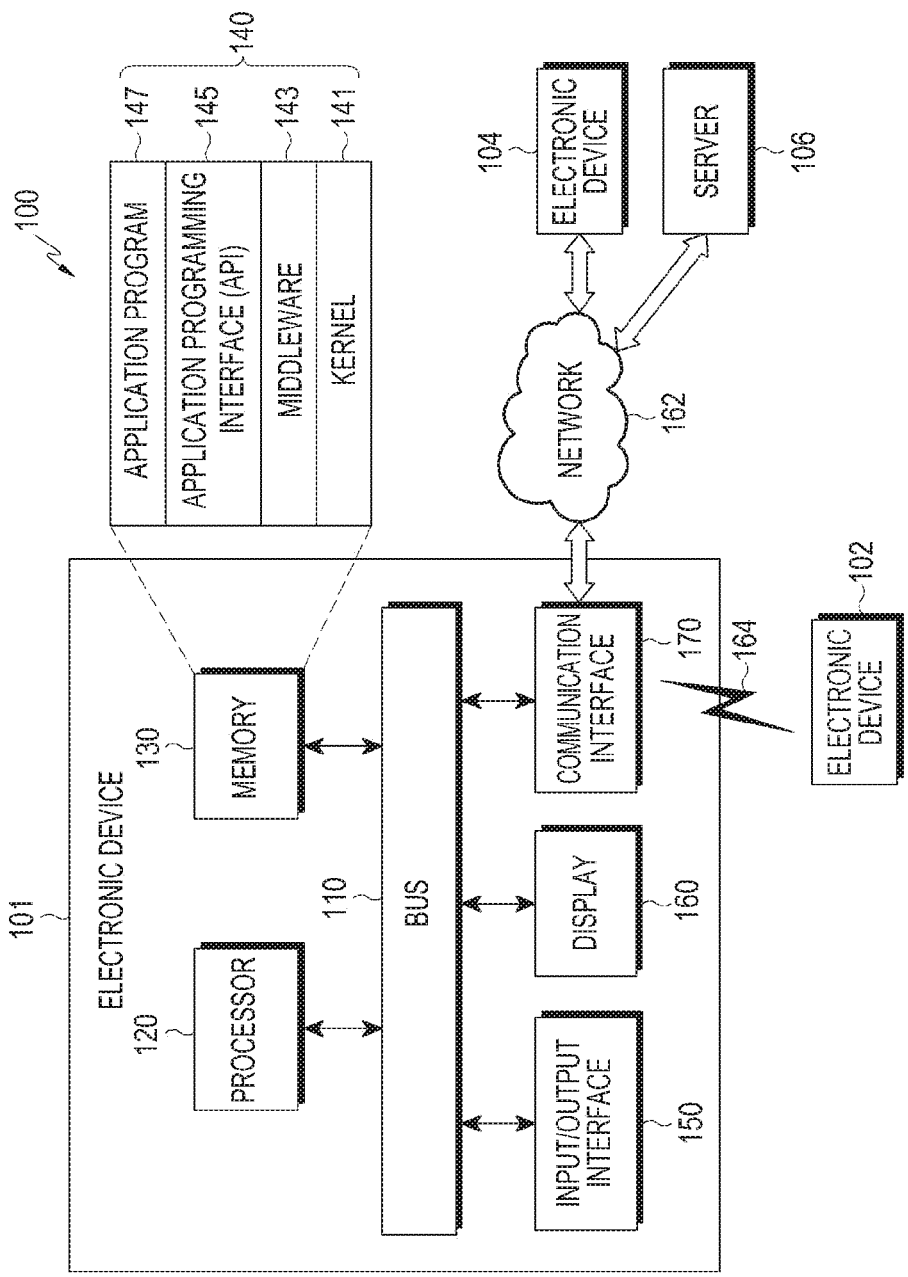
FIG. 1 is a block diagram of an electronic device and a network according to an embodiment of the present disclosure.

Hereinafter, various embodiments of the present disclosure are described with reference to the accompanying drawings. The embodiments and the terms used therein are not intended to limit the present disclosure to specific forms, and are intended to be understood to include various modifications, equivalents, and/or alternatives to the corresponding embodiments of the present disclosure. In describing the accompanying drawings, similar reference numerals may be used to designate similar elements. A singular expression may include a plural expression unless they are definitely different in a context. As used herein, singular forms may include plural forms as well unless the context clearly indicates otherwise. The expressions "a first", "a second", "the first", or "the second" used in the present disclosure may modify various components regardless of the order and/or the importance but are not intended to limit the present disclosure. If an element (e.g., a first element) is referred to as being "(functionally or communicatively) connected" or "directly coupled" to another element (e.g., a second element), the element may be connected directly to the other element or connected to the other element through yet another element (e.g., a third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may indicate that the device, together with other devices or components, "is able to". For example, the expression "processor adapted (or configured) to perform A, B, and C" may indicate a dedicated processor (e.g., an embedded processor) only for performing the corresponding operations or a general-purpose processor (e.g., a central processing unit (CPU) or application processor (AP)) that can perform the corresponding operations by executing one or more software programs stored in a memory device.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. A wearable device may include at least one of an accessory type (e.g., a watch, a ring, a bracelet, an anklet, a necklace, glasses, a contact lens, or an HMD), a fabric or clothing integrated type (e.g., an electronic clothing), a body-mounted type (e.g., a skin pad or tattoo), and a bio-implantable type (e.g., an implantable circuit). An electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

In an embodiment of the present disclosure, an electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sale (POS) device in a shop, or an Internet of Things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). An electronic device may be flexible, or may be a combination of one or more of the aforementioned various devices. An electronic device is not limited to the above described devices. The term "user" may indicate a person using an electronic device or a device (e.g., an artificial intelligence electronic device) using an electronic device.

FIG. 1 is a block diagram of an electronic device 101 and a network 100 according to an embodiment of the present disclosure.

Referring to FIG. 1, the electronic device 101 may include a bus 110, a processor 120, a memory 130, an input/output interface 150, a display 160, and a communication interface 170. In an embodiment of the present disclosure, the electronic device 101 may omit at least one of the elements, or may further include other elements. The bus 110 may include a circuit that interconnects the elements 110 to 170 and transfers communication (e.g., control messages and/or data) between the elements 110 to 170. The processor 120 may include one or more of a CPU, an AP, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment of the present disclosure, the memory 130 may store software and/or a program 140. The program 140 may include, for example, a kernel 141, middleware 143, an application programming interface (API) 145, and/or an application program (or "applications") 147. At least a part of the kernel 141, the middleware 143, or the API 145 may be referred to as an operating system (OS). The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143 may function as, for example, an intermediary for allowing the API 145 or the application 147 to communicate with the kernel 141 to exchange data. Furthermore, the middleware 143 may process one or more task requests, which are received from the application 147, according to a priority. For example, the middleware 143 may assign priority to use the system resources (e.g., the bus 110, the processor 120, the memory 130, or the like) of the electronic device 101 to one or more of the application 147, and may process the one or more task requests. The API 145 is an interface used by the application 147 to control a function provided from the kernel 141 or the middleware 143, and may include, for example, at least one interface or function (e.g., an instruction) for a file control, a window control, image processing, a character control, or the like.

For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or a part of a user's body. The communication interface 170 may establish communication, for example, between the electronic device 101 and a first external electronic device 102, a second external electronic device 104, or a server 106. For example, the communication interface 170 may be connected to a network 162 through wireless or wired communication to communicate with the second external electronic device 104 or the server 106.

The wireless communication may include, for example, a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like. According to an embodiment of the present disclosure, the wireless communication may include, for example, at least one of wireless fidelity (Wi-Fi), Bluetooth, Bluetooth low energy (BLE), ZigBee, near field communication (NFC), magnetic secure transmission, radio frequency (RF), and body area network (BAN). The wireless communication may include global navigation satellite system (GNSS). The GNSS may be, for example, a GPS, a global navigation satellite system (Glonass), a Beidou navigation satellite system (Beidou), or Galileo (the European global satellite-based navigation system). Hereinafter, in this document, "GPS" may be interchangeably used with "GNSS". The wired communication may include, for example, at least one of a universal serial bus (USB), a high definition multimedia interface (HDMI), recommended standard 232 (RS-232), and a plain old telephone service (POTS). The network 162 may include a telecommunications network, for example, at least one of a computer network (e.g., a local area network (LAN) or a wide area network (WAN), the Internet, and a telephone network.

Each of the first and second external electronic devices 102 and 104 may be of a type that is the same as or different from the electronic device 101. According to an embodiment of the present disclosure, all or some of the operations executed in the electronic device 101 may be executed in another electronic device or a plurality of electronic devices (e.g., the electronic devices 102 and 104 or the server 106). If the electronic device 101 must perform some functions or services automatically or by request, the electronic device 101 may make a request for performing at least some functions relating thereto to the electronic device 102 or 104 or the server 106 instead of, or in addition to, performing the functions or services itself. The electronic device 102 or 104, or the server 106 may execute the requested functions or the additional functions, and may deliver a result of the execution to the electronic device 101. The electronic device 101 may provide the received result as is, or may additionally process the received result to provide the requested functions or services. To this end, for example, cloud computing, distributed computing, or client-server computing technology may be used.

According to an embodiment of the present disclosure, the processor 120 may perform control to obtain a video; determine a part corresponding to a user gaze on a first frame, in the first frame of the video; determine a decoding-target part, which includes the part corresponding to the user gaze on the first frame and has a size greater than or equal to the part corresponding to the user gaze on the first frame; decode the decoding-target part; and display, on the display 160, an image associated with the part corresponding to the user gaze on the first frame among the decoding-target part.

According to an embodiment of the present disclosure, the processor 120 may predict a user gaze on at least one frame after the first frame, determine a part corresponding to the user gaze on the at least one frame after the first frame, from the first frame, and determine the decoding-target part including the part corresponding to the user gaze on the first frame and the part corresponding to the user gaze on the at least one frame after the first frame.

According to an embodiment of the present disclosure, the processor 120 may determine, as the decoding-target part, an additional part including a predetermined number of pixels from a boundary of the part corresponding to the user gaze on the first frame and the part corresponding to the user gaze on the at least one frame after the first frame, together with the part corresponding to the user gaze on the first frame and the part corresponding to the user gaze on the at least one frame after the first frame. The predetermined number may vary based on the reliability of the future user gaze.

According to an embodiment of the present disclosure, the processor 120 may perform control to determine a part corresponding to a user gaze on a second frame of the video; decode the part corresponding to the user gaze on the second frame; and display, on the display 160, an image associated with the part corresponding to the user gaze on the second frame.

According to an embodiment of the present disclosure, the processor 120 may predict at least one block of the part corresponding to the user gaze on the second frame from at least one block of the decoding-target part of the first frame.

According to an embodiment of the present disclosure, the processor 120 may determine a decoding-target part of the second frame, which includes the part corresponding to the user gaze on the second frame and has a size greater than or equal to the part corresponding to the user gaze on the second frame, and may decode the decoding-target part of the second frame.

According to an embodiment of the present disclosure, if it is determined that at least one block in the decoding-target part of the second frame is not decodable, the processor 120 may perform error correction with respect to the at least one block which is not decodable.

According to an embodiment of the present disclosure, the processor 120 may predict the user gaze on the at least one frame after the first frame based on at least one of sensing data from a sensor of the electronic device 101, a behavioral habit of a user of the electronic device, and information associated with content of the video.

According to an embodiment of the present disclosure, the processor 120 may decode a first block of the decoding-target part independently, and may predict a second block of the decoding-target part by referring to the first block, wherein the first block is not included in the part corresponding to the user gaze on the first frame and the second block is included in the part corresponding to the user gaze on the first frame.

According to an embodiment of the present disclosure, the electronic device 101 may perform encoding. In this instance, the processor 120 may perform control to obtain a video including a wide-angle image for providing a virtual reality service; receive information associated with a current user gaze from the electronic device that performs decoding; determine a part corresponding to a user gaze on the first frame using the current user gaze, from the first frame of the video; determine an encoding-target part, which includes the part corresponding to the user gaze on the first frame and has a size greater than or equal to the part corresponding to the user gaze on the first frame; encode the encoding-target part; and transmit encoded data to the electronic device that performs decoding.

According to an embodiment of the present disclosure, the processor 120 may determine the encoding-target part including the part corresponding to the user gaze on the first frame and a part corresponding to a user gaze on at least one frame after the first frame.

According to an embodiment of the present disclosure, the processor 120 may determine, as the encoding-target part, an additional part including a predetermined number of pixels from a boundary of the part corresponding to the user gaze on the first frame and the part corresponding to the user gaze on the at least one frame after the first frame, together with the part corresponding to the user gaze on the first frame and the part corresponding to the future user gaze. The encoding-target part includes a plurality of blocks, and the sizes of the plurality of blocks are the same as or different from one another.

According to an embodiment of the present disclosure, the processor 120 may determine the encoding-target part by taking into consideration a delay between a time when the encoding is performed and a time when displaying is performed in the electronic device that performs decoding.

Figure 2:
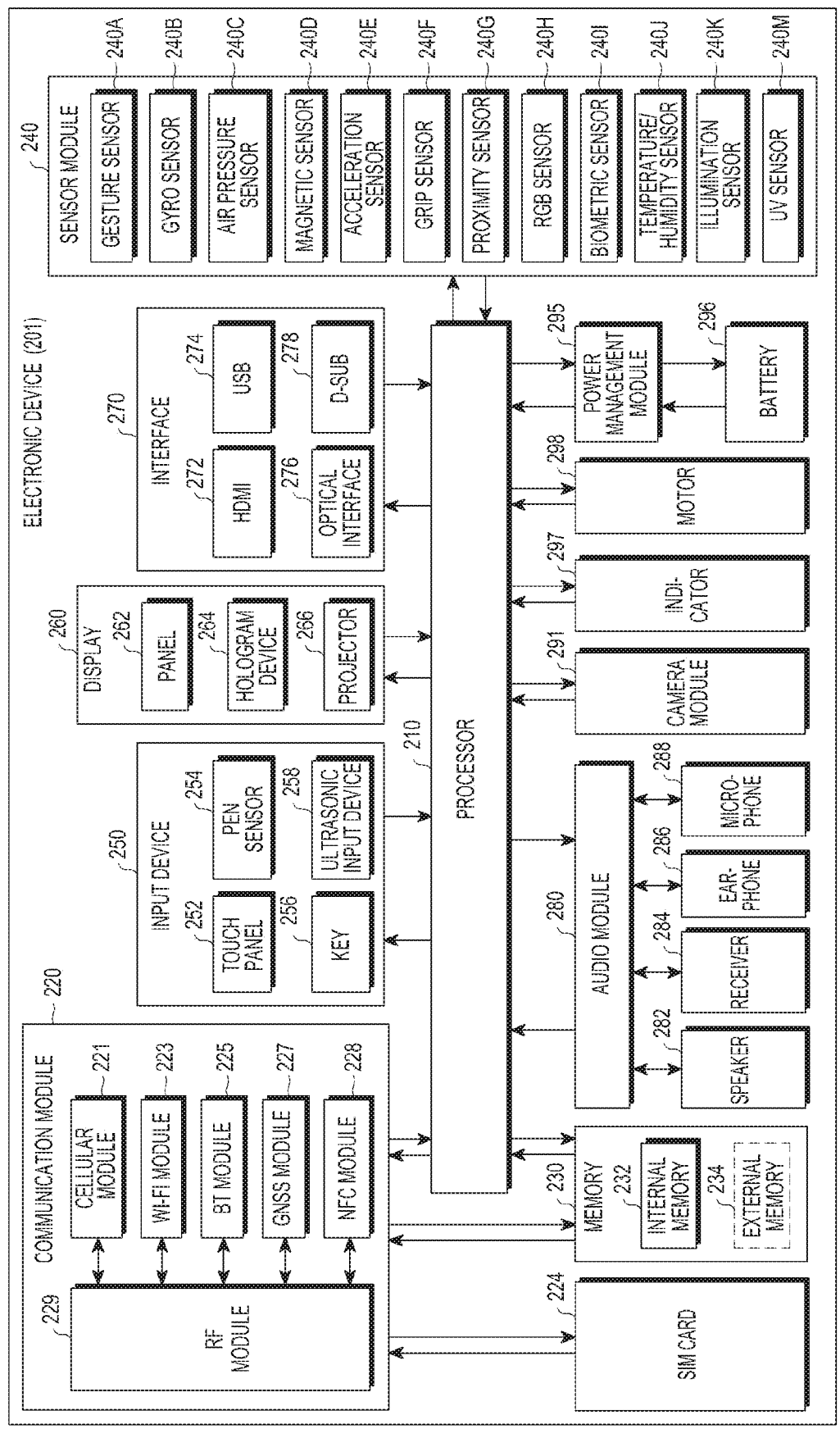
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, the whole or part of the electronic device 101 illustrated in FIG. 1. The electronic device 201 may include at least one processor 210 (e.g., an AP), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be embodied, for example, as a system on chip (SoC). According to an embodiment of the present disclosure, the processor 210 may further include a graphics processing unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory), process the loaded instructions or data, and store result data in the non-volatile memory.

The communication module 220 may have a configuration that is the same as, or similar to, that of the communication interface 170 in FIG. 1. The communication module 220 in FIG. 2 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify and authenticate the electronic device 201 within a communication network using the SIM card 224. The cellular module 221 may perform at least some of the functions that the processor 210 may provide. The cellular module 221 may include a CP. At least some (e.g., two or more) of the cellular module 221, the Wi-Fi module 223, the BT module 225, the GNSS module 227, and the NFC module 228 may be included in one integrated circuit (IC) or IC package. The RF module 229, for example, may transmit/receive a communication signal (e.g., an RF signal). The RF module 229 may include, for example, a transceiver, a power amplifier module (PAM), a frequency filter, a low noise amplifier (LNA), an antenna, or the like. At least one of the cellular module 221, the Wi-Fi module 223, the BT module 225, the GNSS module 227, and the NFC module 228 may transmit/receive an RF signal through a separate RF module. The SIM card 224 may include, for example, an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include, for example, at least one of a volatile memory (e.g., a dynamic random access memory (DRAM), a static random access memory (SRAM), a synchronous DRAM (SDRAM), or the like) and a non-volatile memory (e.g., a one-time programmable read only memory (ROM) (OTPROM), a programmable ROM (PROM), an electrically programmable ROM (EPROM), an electrically erasable PROM (EEPROM), a mask ROM, a flash ROM, a flash memory, a hard drive, or a solid state drive (SSD)). The external memory 234 may include a flash drive, for example, a compact flash (CF), a secure digital (SD) card, a micro-SD card, a mini-SD card, an extreme digital (xD) card, a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) light sensor 240M. Additionally or alternatively, the sensor module 240 may include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor configured to control the sensor module 240 as a part of or separately from the processor 210, and may control the sensor module 240 while the processor 210 is in a reduced power or sleep state.

The input device 250 may include, for example, a touch panel 252, a (digital) pen sensor 254, a key 256, or an ultrasonic input device 258. The touch panel 252 may use, for example, at least one of a capacitive type panel, a resistive type panel, an infrared type panel, and an ultrasonic type panel. Furthermore, the touch panel 252 may further include a control circuit. The touch panel 252 may further include a tactile layer to provide a tactile reaction to a user. The (digital) pen sensor 254 may include, for example, a recognition sheet that is a part of, or separated from, the touch panel 252. The key 256 may include, for example, a physical button, an optical key, or a keypad. The ultrasonic input device 258 may detect ultrasonic waves, which are generated by an input tool, through a microphone 288 to identify data corresponding to the detected ultrasonic waves.

The display 260 (e.g., the display 160 in FIG. 1) may include a panel 262, a hologram device 264, a projector 266, and/or a control circuit for controlling the same. The panel 262 may be implemented to be, for example, flexible, transparent, or wearable. The panel 262, together with the touch panel 252, may be configured as one or more modules. According to an embodiment an embodiment of the present disclosure, the panel 262 may include a pressure sensor (or a POS sensor), which may measure a strength of pressure of a user's touch. The pressure sensor may be embodied as a single entity integrated with the touch panel 252 or may be embodied with one or more sensors separated from the touch panel 252. The hologram device 264 may show a three dimensional image in the air by using an interference of light. The projector 266 may display an image by projecting light onto a screen. The screen may be located, for example, in the interior of, or exterior to, the electronic device 201. The interface 270 may include, for example, an HDMI 272, a USB 274, an optical interface 276, or a D-subminiature (D-sub) connector 278. The interface 270 may be included, for example, in the communication interface 170 illustrated in FIG. 1. Additionally or alternatively, the interface 270 may, for example, include a mobile high-definition link (MHL) interface, SD card/MMC interface, or an infrared data association (IrDA) standard interface.

The audio module 280, for example, may convert a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that may photograph a still image and a moving image. According to an embodiment of the present disclosure, the camera module 291 may include one or more image sensors (e.g., a front sensor or a rear sensor), a lens, an image signal processor (ISP), or a flash (e.g., an LED or xenon lamp). The power management module 295 may manage, for example, the power of the electronic device 201. The power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the residual charge of the battery 296, and a voltage, current, or temperature while charging. The battery 296 may include, for example, a rechargeable battery and/or a solar battery.

The indicator 297 may indicate a particular state (e.g., a booting state, a message state, a charging state, and the like) of the electronic device 201 or a part (e.g., the processor 210) thereof. The motor 298 may convert an electrical signal into a mechanical vibration and may generate a vibration, haptic effect, or the like. The electronic device 201 may include a mobile TV support device that can process media data according to a standard, such as digital multimedia broadcasting (DMB), digital video broadcasting (DVB), mediaFlo™, and the like. Each of the above-described elements of hardware according to the present disclosure may be configured with one or more components, and the names of the corresponding elements may vary based on the type of electronic device. In an embodiment of the present disclosure, an electronic device (e.g., the electronic device 201) may omit some elements or may further include additional elements, or some of the elements of the electronic device may be coupled to each other to configure one entity, in which case the entity may perform the identical functions of the corresponding elements prior to the coupling.

Figure 3:
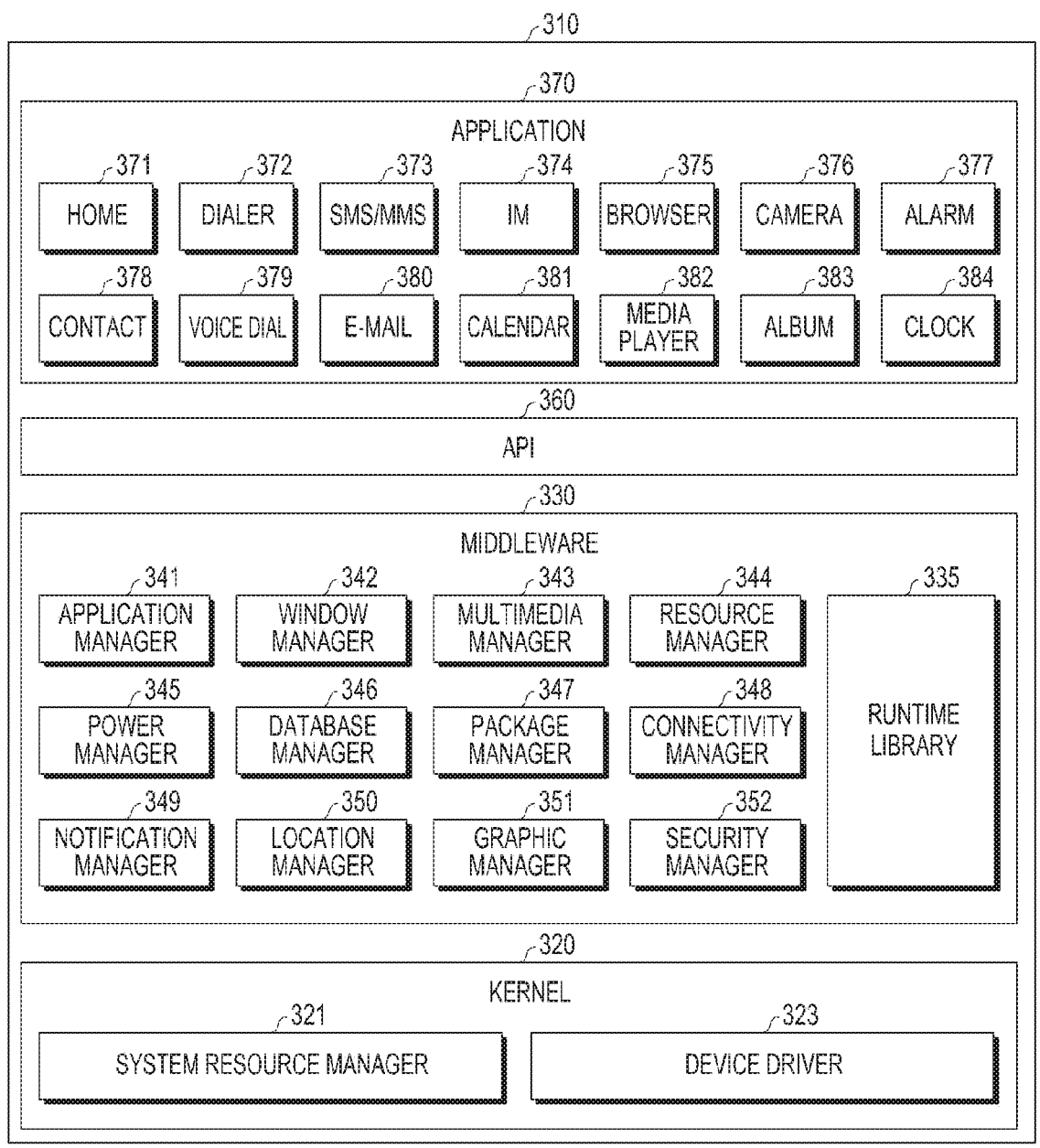
FIG. 3 is a block diagram of a program module according to an embodiment of the present disclosure.

FIG. 3 is a block diagram of a program module 310 according to an embodiment of the present disclosure.

Referring to FIG. 3, the program module 310 (e.g., the program 140 in FIG. 1) may include an OS that controls resources relating to an electronic device (e.g., the electronic device 101 of FIG. 1) and/or various applications (e.g., the application programs 147 of FIG. 1) that are driven in the OS. The operating system may include, for example, Android®, iOS®, Windows®, Symbian®, Tizen®, or Bada™. The program module 310 may include a kernel 320 (e.g., the kernel 141 in FIG. 1), middleware 330 (e.g., the middleware 143 in FIG. 1), an API 360 (e.g., the API 145 in FIG. 1), and/or an application 370 (e.g., the application program 147 in FIG. 1). At least a part of the program module 310 may be preloaded on the electronic device, or may be downloaded from an external electronic device (e.g., the electronic device 102 or 104 or the server 106 in FIG. 1).

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the application 370 in common, or may provide various functions to the application 370 through the API 360 such that the application 370 can efficiently use limited system resources within the electronic device. The middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the application 370 is executed. The runtime library 335 may manage input/output, manage a memory, or process an arithmetic function. The application manager 341 may manage, for example, the life cycles of the application 370. The window manager 342 may manage graphical user interface (GUI) resources used for a screen. The multimedia manager 343 may identify formats required for reproducing various media files and may encode or decode a media file using a codec suitable for a corresponding format. The resource manager 344 may manage source code of the application 370 or the space of a memory. The power manager 345 may manage, for example, the capacity or power of a battery and may provide power information required for operating the electronic device. According to an embodiment of the present disclosure, the power manager 345 may interoperate with a basic input/output system (BIOS). The database manager 346 may, for example, generate, search, or change databases to be used by the application 370. The package manager 347 may manage the installation or update of an application that is distributed in the form of a package file.

The connectivity manager 348 may manage, for example, a wireless connection. The notification manager 349 may provide an event (e.g., an arrival message, an appointment, a proximity notification, and the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment of the present disclosure, the middleware 330 may include a telephony manager for managing a voice or video call function of the electronic device or a middleware module that is capable of forming a combination of the functions of the above-described elements. The middleware 330 may provide specialized modules according to the types of operation systems. Furthermore, the middleware 330 may dynamically remove some of the existing elements, or may add new elements. The API 360 is, for example, a set of API programming functions, and may be provided in different configurations according to operating systems. For example, in the case of Android® or iOS®, one API set may be provided for each platform, and in the case of Tizen®, two or more API sets may be provided for each platform.

The application 370 may include applications that provide, for example, a home application 371, a dialer application 372, an SMS/MMS application 373, an instant messaging (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., measuring an exercise quantity or blood glucose level), an environmental information application (e.g., atmospheric pressure, humidity, or temperature information), and the like.

According to an embodiment of the present disclosure, the application 370 may include an information exchange application that may support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device.

The applications 370 may include applications (e.g., a health care application of a mobile medical appliance) that are designated according to the attributes of an external electronic device. The application 370 may include applications received from an external electronic device. At least some of the program module 310 may be implemented (e.g., executed) by software, firmware, hardware (e.g., the processor 210 in FIG. 1), or a combination of two or more thereof and may include a module, a program, a routine, an instruction set, or a process for performing one or more functions.

The term "module" as used herein may include a unit consisting of hardware, software, or firmware, and may, for example, be used interchangeably with the terms "logic", "logical block", "component", "circuit", or the like. The term "module" may indicate an integrated component, or a minimum unit for performing one or more functions or a part thereof. The term "module" may be mechanically or electronically implemented and may include, for example, an application specific IC (ASIC) chip, a field-programmable gate array (FPGA), or a programmable-logic device, which is known or will be developed in the future, for performing certain operations.

At least some of the devices (e.g., modules or functions thereof) or methods (e.g., operations) according to an embodiment of the present disclosure may be implemented by an instruction which is stored in a non-transitory computer-readable storage medium (e.g., the memory 130 in FIG. 1) in the form of a program module. The instruction, if executed by a processor (e.g., the processor 120 in FIG. 1), may cause the one or more processors to execute the function corresponding to the instruction. The non-transitory computer-readable storage medium may include a hard disk, a floppy disk, a magnetic medium (e.g., a magnetic tape), an optical media (e.g., compact disk ROM (CD-ROM), DVD), a magneto-optical media (e.g., a floptical disk), an inner memory, etc. The instruction may include code generated by a compiler or code that may be executed by an interpreter. Operations performed by a module, a programming module, or other elements according to an embodiment of the present disclosure may be executed sequentially, in parallel, repeatedly, or in a heuristic manner. At least some operations may be executed according to another sequence, may be omitted, or may further include other operations.

Figure 4A:
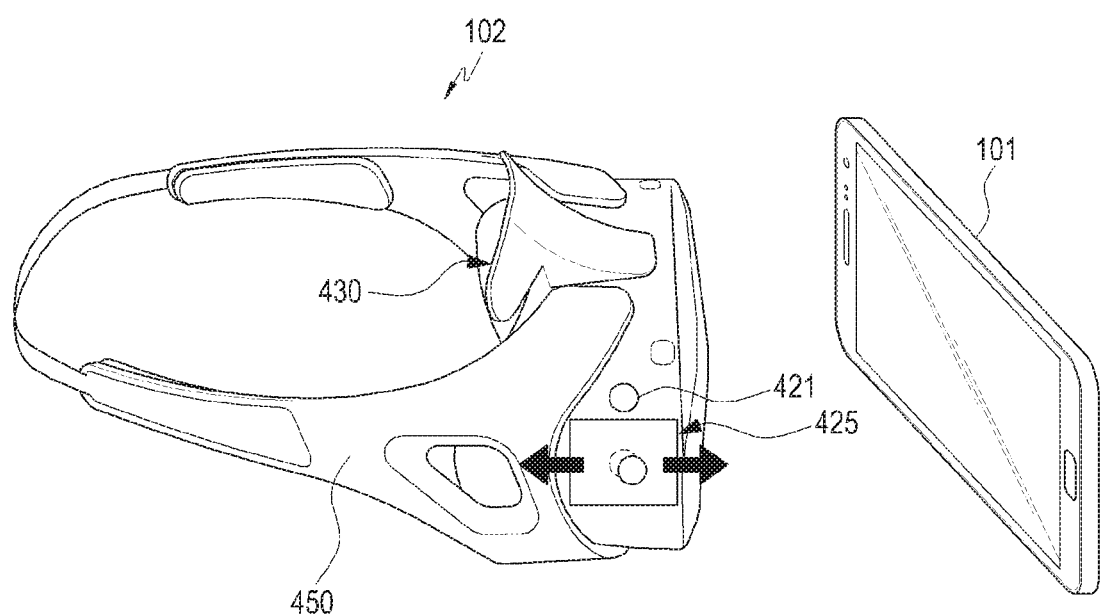
FIG. 4A is a perspective view of an electronic device according to an embodiment of the present disclosure.

FIG. 4A is a perspective view of the electronic device 101 and the electronic device 102 according to an embodiment of the present disclosure.

Referring to FIG. 4A, the electronic device 101 may include a display. The electronic device 101 may store a virtual reality application. The virtual reality application may be an application which may provide a display similar to an actual reality to a user. According to an embodiment of the present disclosure, the virtual reality application may display an image for the left eye (hereinafter, left eye image) and an image for the right eye (hereinafter, right eye image) respectively corresponding to the eyes of the user based on a stereo scheme.

The electronic device 102 may be an HMD. The HMD may be mounted on a user's head and may be fixed to the user's head if the user moves. The electronic device 101 may be coupled to the electronic device 102. Accordingly, if the user wears the electronic device 102 coupled to the electronic device 101, the user may view a left eye image and a right eye image displayed on a display of the electronic device 101.

The electronic device 102 according to an embodiment of the present disclosure may include a housing 450 provided to be worn on the user's head, a blackout part 430 fixed to the housing 450 and provided at an area corresponding to locations of the user's eyes, and at least one input button 421 provided at one area of the housing 450. The electronic device 102 may include an input pad 425 which may receive a swipe input from the user.

The user may make the blackout part 430 fit closely to both eyes of the user and, accordingly, the user may view the image by the virtual reality application provided from the electronic device 101 without any interference from external light.

The electronic device 101 may be coupled to the electronic device 102. The electronic device 101 may be connected to the electronic device 102 in a wired/wireless manner. For example, although the electronic device 101 may be connected to the electronic device 102 based on a USB, it is only an example and it may be easily understood by those skilled in the art that there is no limitation on the connection if the connection allows data transmission/reception between the two devices 101 and 102. According to an embodiment of the present disclosure, the electronic device 101 may be physically coupled to the electronic device 102.

Figure 4B:
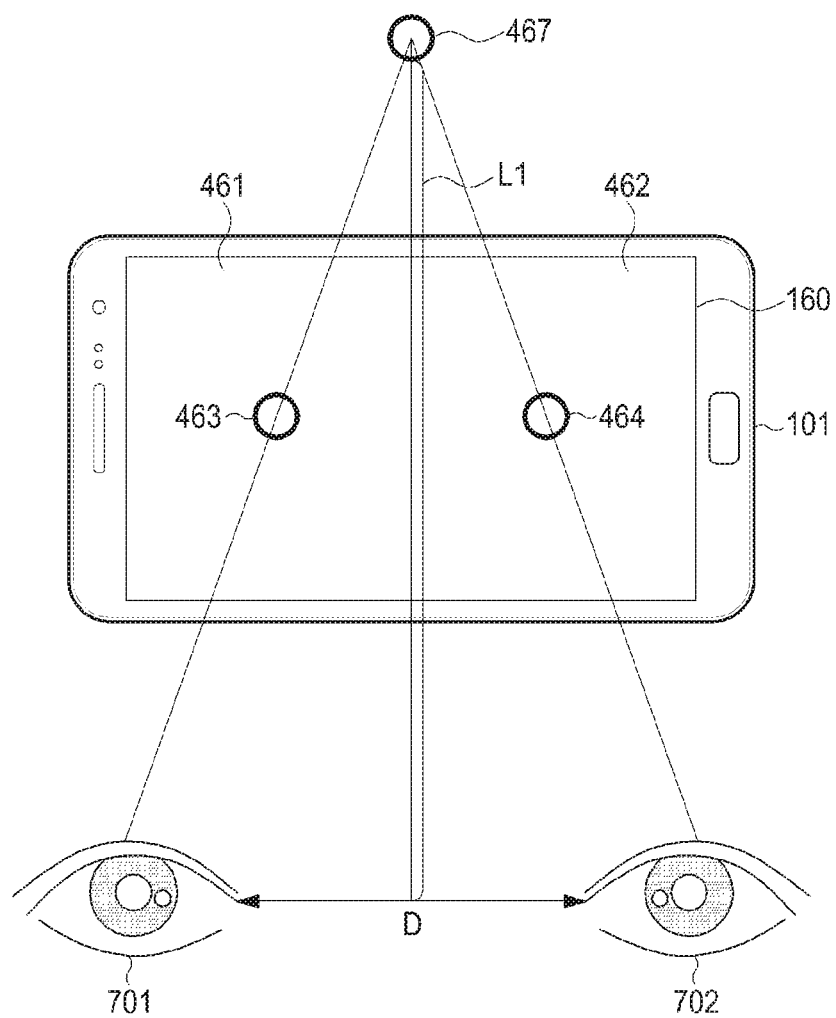
FIG. 4B illustrates displaying by an electronic device according to an embodiment of the present disclosure.

FIG. 4B illustrates displaying by the electronic device 101 according to an embodiment of the present disclosure.

Referring to FIG. 4B, the electronic device 101 may display a left eye image 461 and a right eye image 462 on the display 160. The left eye image 461 may include a first object 463, and the right eye image 462 may include a second object 464. In this case, the first object 463 may correspond to a left eye 701, and the second object 464 may correspond to a right eye 702. In FIG. 4B, an interpupillary distance (IPD) corresponding to a distance between the left eye 701 and the right eye 702 may be D. The left eye image 461 and the right eye image 462 may correspond to the eyes of the user, respectively, and may be images that enable the user to have a sense of depth when viewing an image. According to an embodiment of the present disclosure, the left eye image 461 and the right eye image 462 may be images for a virtual reality service, and may be images obtained by configuring a part of the entire screen for the virtual reality service to have a sense of three dimensions. For example, the left eye image 461 and the right eye image 462 may be produced to be different from each other so as to provide a sense of depth, and the user may feel a sense of depth by viewing the different images with both eyes.

The electronic device 101 may display the first object 463 and the second object 464 with a predetermined distance therebetween. The user may view an object image 467, which exists at the intersection of a straight line passing through a left eye 701 and the first object 463 and a straight line passing a right eye 702 and the second object 464. For example, the user may view an object image which exists at a point, which is a distance L1 from the user.

According to an embodiment of the present disclosure, the electronic device 101 may display the first object 463 and the second object 464, which have a loop shape.

Figure 4C:
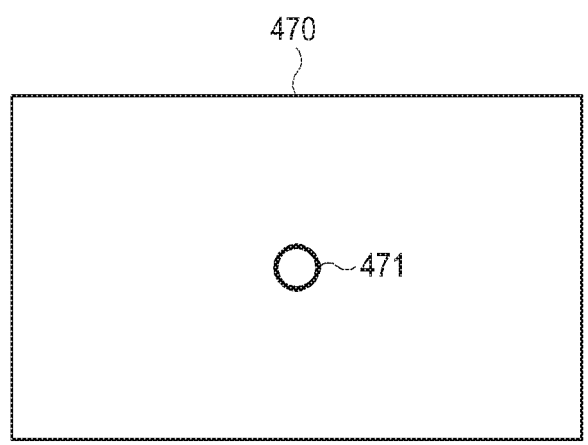
FIG. 4C illustrates a screen viewed by a user.

FIG. 4C illustrates a screen viewed by a user.

Referring to FIG. 4C, a user may view a screen including a loop-shaped image 471.

Although FIGS. 4A, 4B, and 4C illustrate that the electronic device 101 is separated from the electronic device 102 to be worn by a user, this is merely an example, and the electronic device 101 may be embodied as a device integrated with the electronic device 102.

Figure 5A:
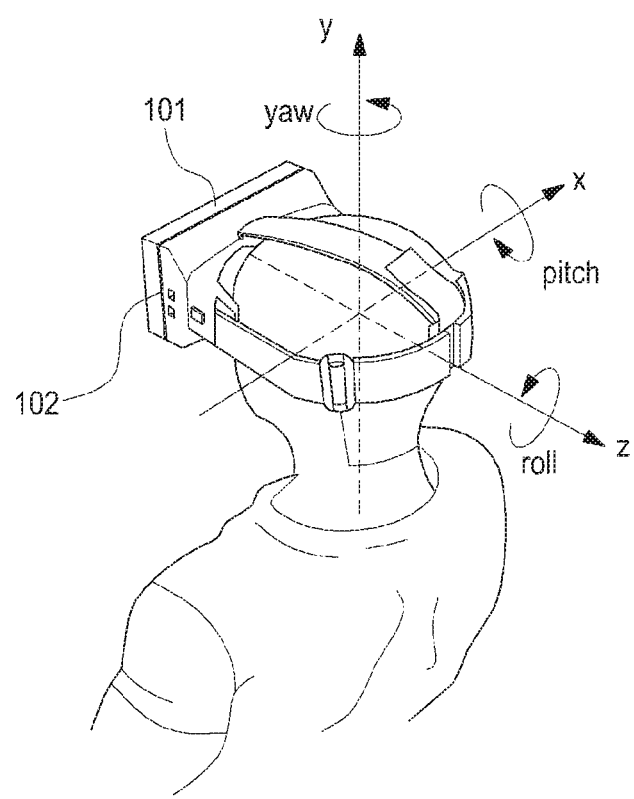
FIG. 5A is a perspective view of an HMD worn by a user.

FIG. 5A is a perspective view of an HMD worn by a user.

Referring to FIG. 5A, a user may wear a housing on his/her head. Further, the electronic device 101 may be coupled to the electronic device 102, and the user may view an image displayed on a display of the electronic device 101.

The electronic device 101 may display a left eye image and a right eye image on the left and right parts of the display, respectively. The left eye image may be incident on the left eye of the user, and the right eye image may be incident on the right eye of the user. For example, the left eye image and the right eye image may be incident on the entire visual field of the eyes of the user, respectively. The user may receive a virtual reality service by viewing the images incident on both eyes. According to an embodiment of the present disclosure, not all of a left eye image and a right eye image are displayed in a single device, but the left eye image and the right eye image may be displayed in two or more displays, respectively. Alternatively, the electronic device may display a single image, as opposed to a left eye image and a right eye image.

The virtual reality application executed by the electronic device 101 may display a binocular image on the display. The virtual reality application may change and display the binocular image according to a movement (yaw, pitch, or roll) of the user or the electronic device 102.

Alternatively, the electronic device 101 may change a binocular image based on a command obtained by various input devices, such as a joystick, a mouse, a keyboard, a handle-shaped input device, a face direction tracking device, and the like. In this case, a user gaze may be a direction indicated by various input devices, rather than to an actual user gaze.

The electronic device 102 may receive a command by at least one of the input button 421 and the input pad 425, in FIG. 4A, from the user. For example, the electronic device 101 may obtain a focus control command or a focus adjustment command from the electronic device 102. According to an embodiment of the present disclosure, the user may directly input a focus control command or a focus adjustment command into the electronic device 101.

For example, if the user inputs a swipe gesture in a first direction of the input pad 425, the electronic device 101 may perform a control command corresponding to the swipe gesture.

FIGS. 5B, 5C, 5D, and 5E illustrate screen switching by an electronic device according to an embodiment of the present disclosure.

Figure 5B:
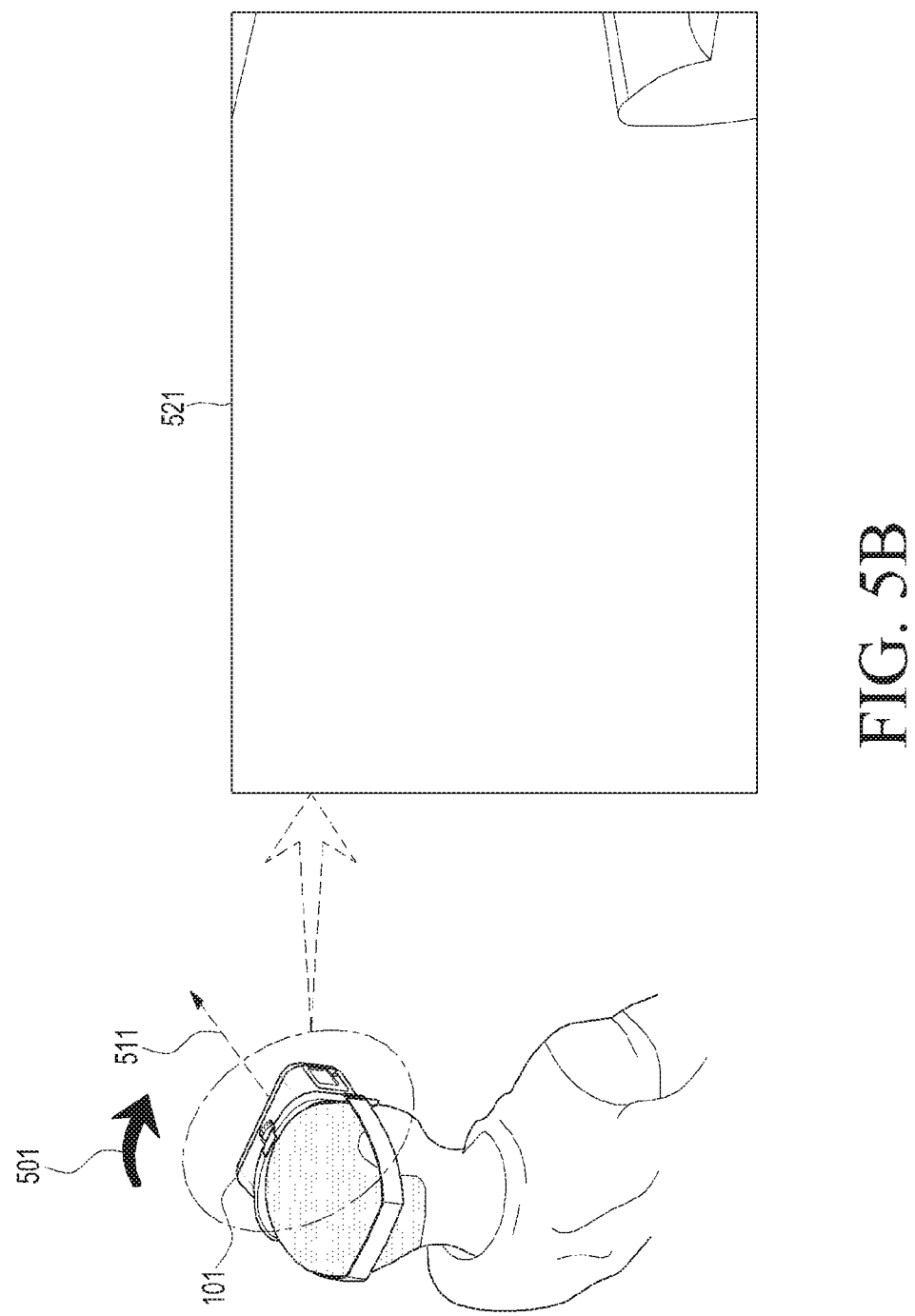
FIGS. 5B, 5C, 5D, and 5E illustrate screen switching of an electronic device according to an embodiment of the present disclosure.

Referring to FIG. 5B, a user may gaze in a first direction 511 in a state in which the user wears the electronic device 101. The electronic device 101 may display a left eye image and a right eye image for a first virtual screen 521 to allow the user to view the first virtual screen 521. The first virtual screen 521 may be a screen corresponding to a part of the entire screen configured in the virtual reality service. In addition, the user may turn his/her head in a right direction 501, and the electronic device 101 may sense the rotation in the right direction 501.

Figure 5C:
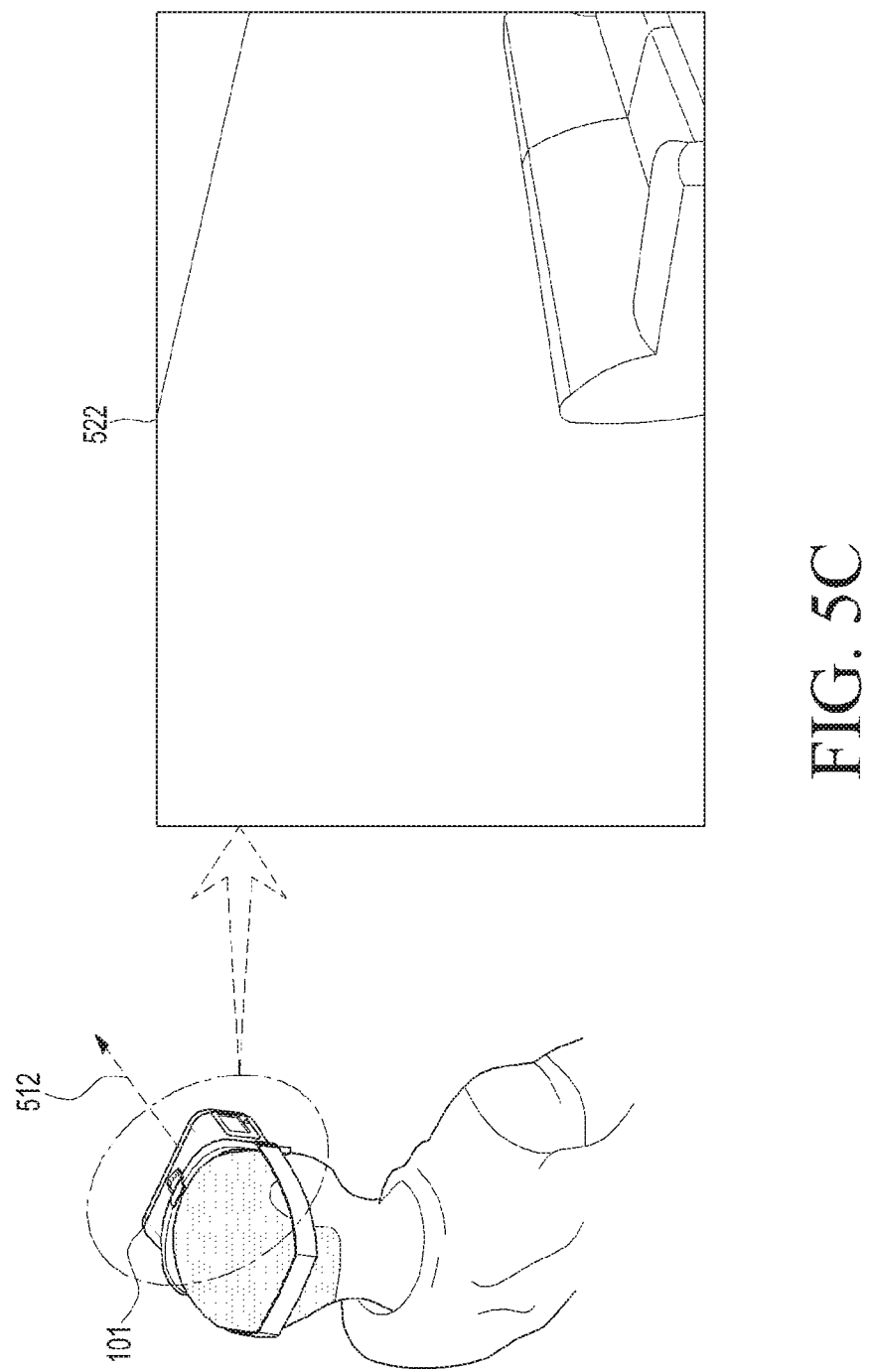
Figure 5D:
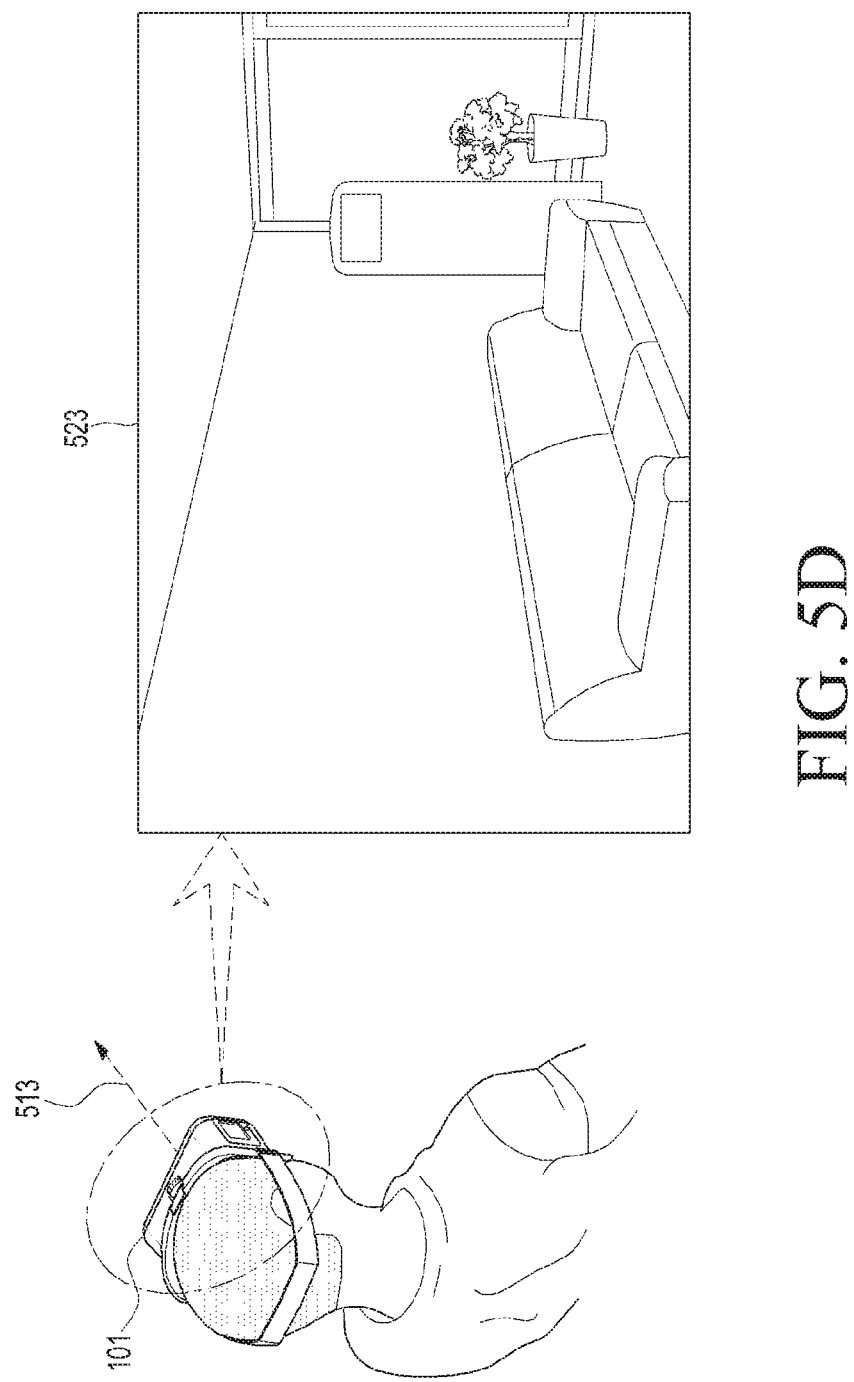
Figure 5E:
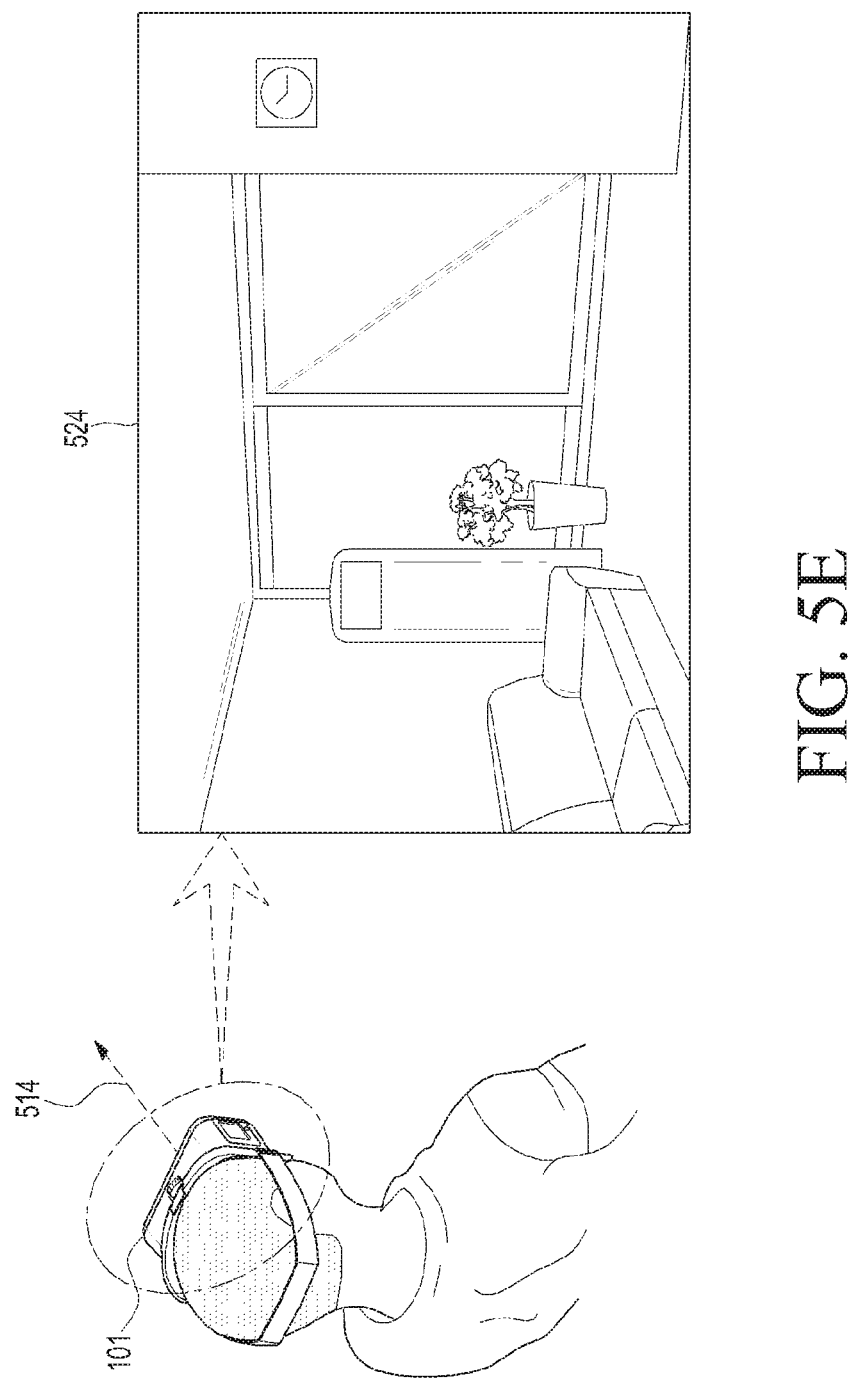

Referring to FIGS. 5C, 5D, and 5E, the user may turn his/her head in a second direction 512, a third direction 513, and a fourth direction 514 from the first direction 511. The electronic device 101 may sense the rotation in the fourth direction 514 from the first direction 511. The electronic device 101 may change and display the first virtual screen 521 in response to the rotation. For example, the electronic device 101 may display a second virtual screen 522 in accordance with the second direction 512, a third virtual screen 523 in accordance with the third direction 513, and a fourth virtual screen 524 in accordance with the fourth direction 514. For example, the electronic device 101 may display a left eye image and a right eye image for displaying each of the virtual screens. Each of the first virtual screen 521 to the fourth virtual screen 524 may be a partial screen of the entire screen for the virtual reality service. As illustrated in FIGS. 5B, 5C, 5D, and 5E, the second virtual screen 522 may be a screen for a foreground arranged relatively on the right side of the first virtual screen 521, the third virtual screen 523 may be a screen for a foreground arranged relatively on the right side of the second virtual screen 522, and the fourth virtual screen 524 may be a screen for a foreground arranged relatively on the right side of the third virtual screen 523. Accordingly, as the user turns his/her head in the right direction, the user may sequentially view the foregrounds arranged relatively on the right sides.

Figure 6A:
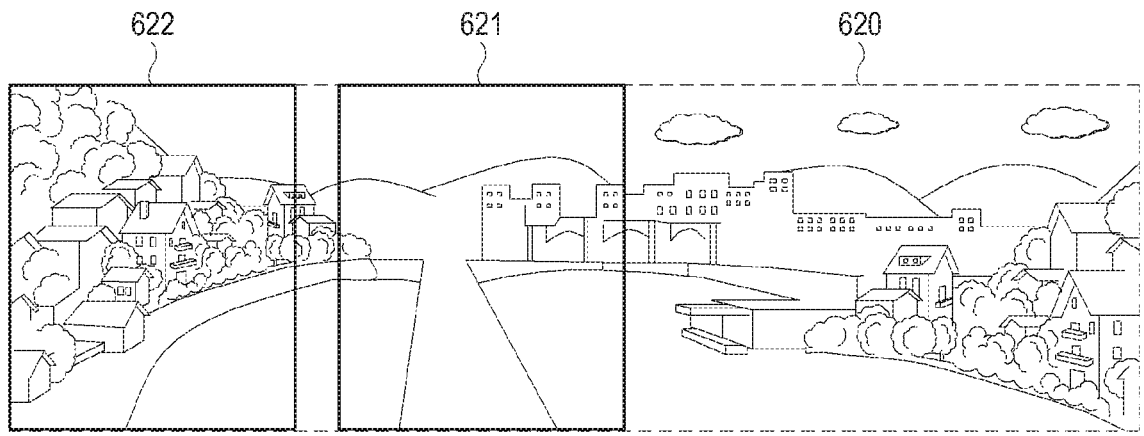
FIGS. 6A and 6B illustrate operations of an electronic device according to an embodiment of the present disclosure.
Figure 6A:
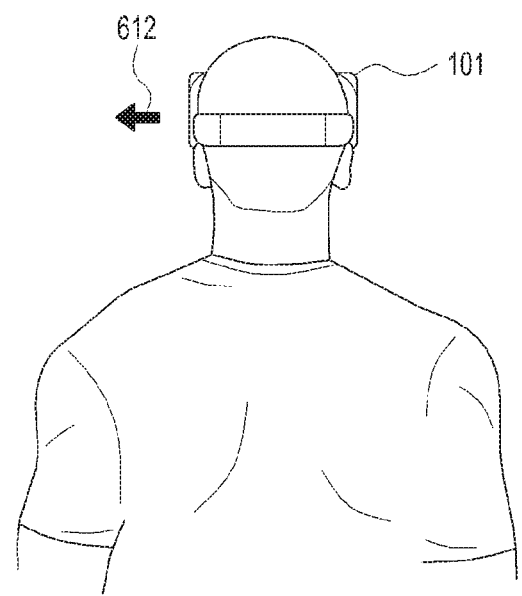
Figure 6B:
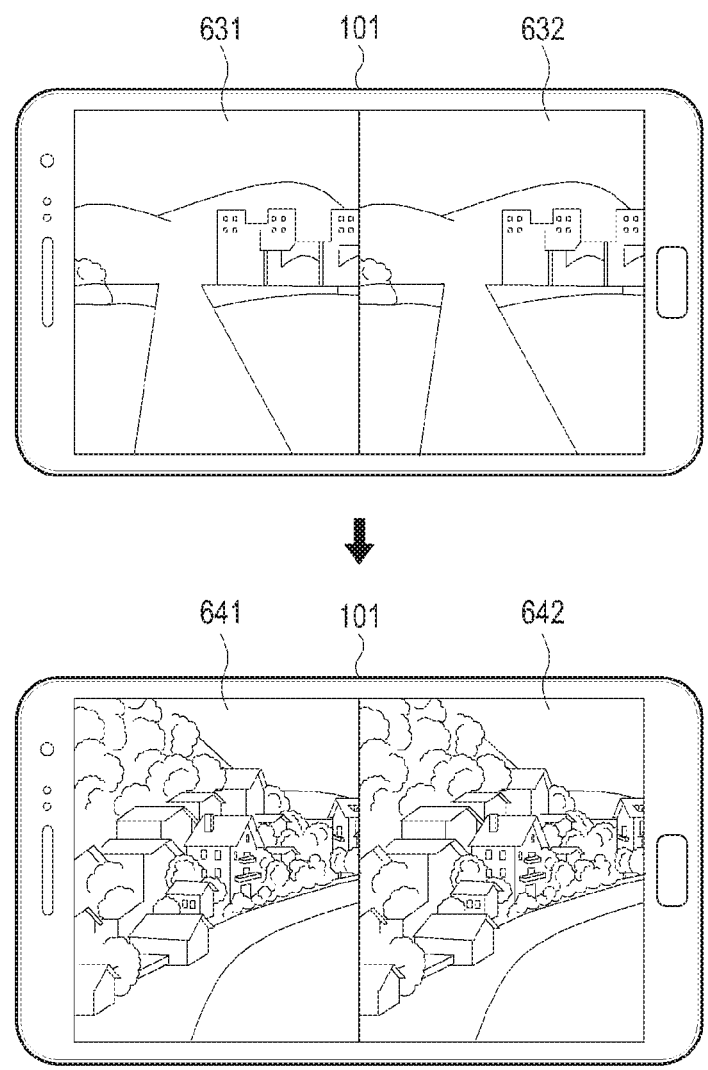

FIGS. 6A and 6B illustrate operations of an electronic device according to an embodiment of the present disclosure.

Referring to FIGS. 6A and 6B, the electronic device 101 may display a first part 621 of a wide-angle image, that is, an entire image 620, such as a panorama. For example, as illustrated in FIG. 6B, the electronic device 101 may display a left eye image 631 corresponding to the first part 621 on at least a part of the left half of a display, and may display a right eye image 632 corresponding to the first part 621 on at least a part of the right half of the display. Accordingly, a user may view the first part 621 with a sense of depth.

While viewing the first part 621, the user may turn his/her head in the left direction. Accordingly, the electronic device 101 may sense a rotation 612 in the left direction. The electronic device 101 may display a left eye image 641 and a right eye image 642 corresponding to a second part 622 which is relatively on the left in the entire image 620, in response to the sensed rotation 612 to the left. Accordingly, as the user turns his/her head, the user may view a part corresponding to a changed gaze, and thus, may be provided with a service with a sense of reality.

Although the embodiment of FIG. 6A illustrates that the electronic device 101 displays a still image, this is merely an example. The electronic device 101 according to an embodiment of the present disclosure may display a video image. The electronic device 101 may display parts corresponding to a user gaze on each of a plurality of frames included in a video. That is, the electronic device 101 may store or stream a video including wide-angle images, and the video may include a plurality of wide-angle images as frames.

A relatively greater amount of resources may be required to enable the electronic device 101 to decode the entire image 620, in order to promptly switch a screen in response to the rotation 612. Accordingly, the electronic device 101 according to an embodiment of the present disclosure may decode a part of the entire image 620.

Figure 7:
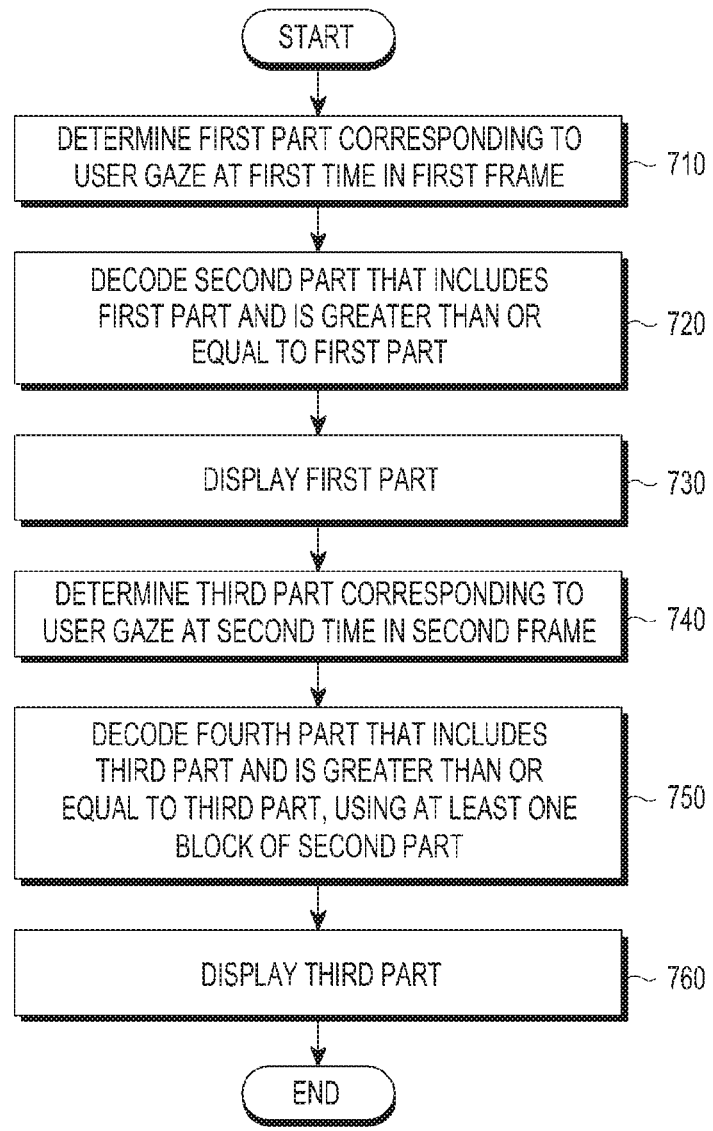
FIG. 7 is a flowchart of a method of an electronic device according to an embodiment of the present disclosure.

FIG. 7 is a flowchart of a control method of an electronic device according to an embodiment of the present disclosure. FIG. 7 is described below in greater detail with reference to FIGS. 8A and 8B.

Figure 8A:
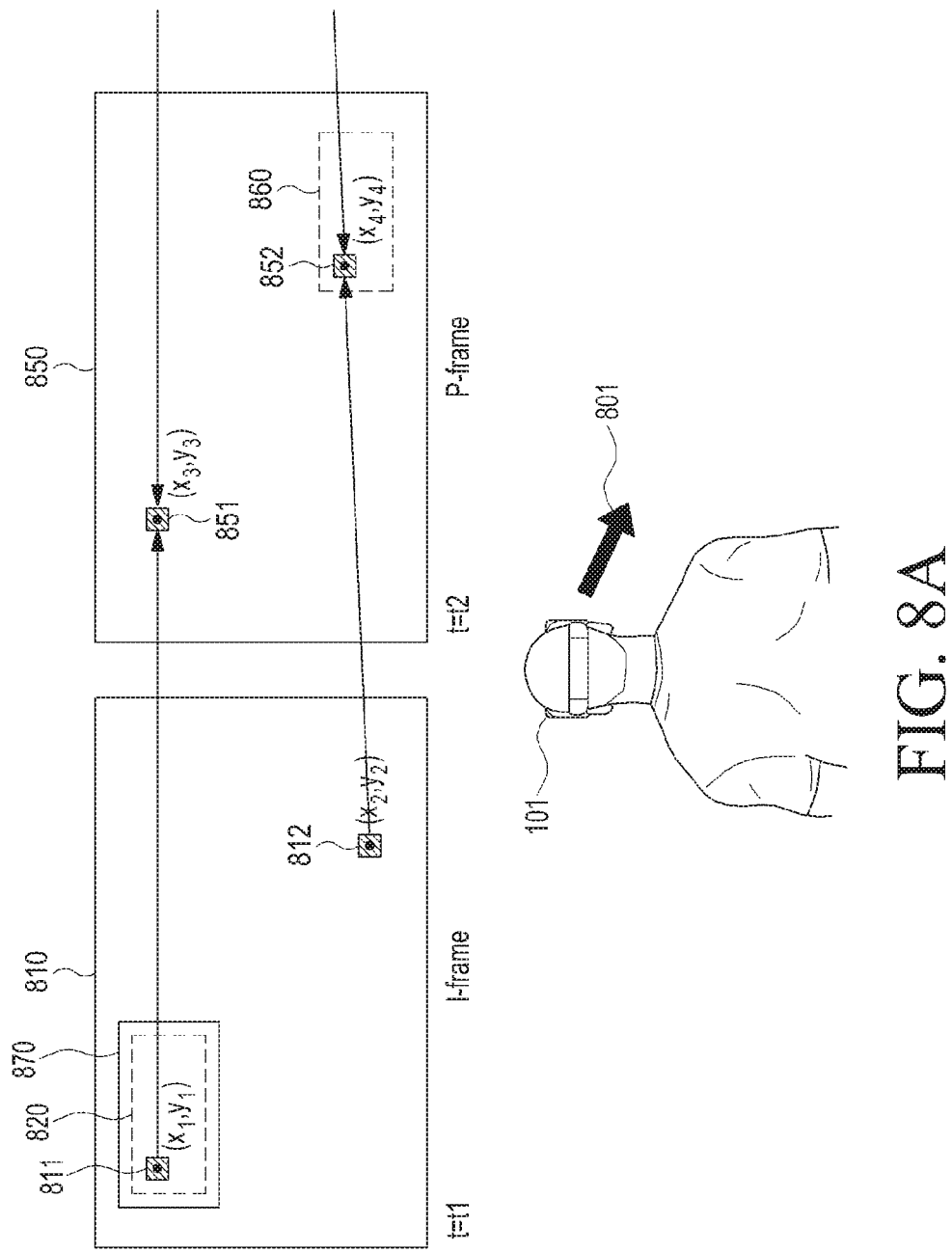
FIG. 8A illustrates a frame included in a video according to an embodiment of the present disclosure.

FIG. 8A illustrates a frame included in a video according to an embodiment of the present disclosure.

Figure 8B:
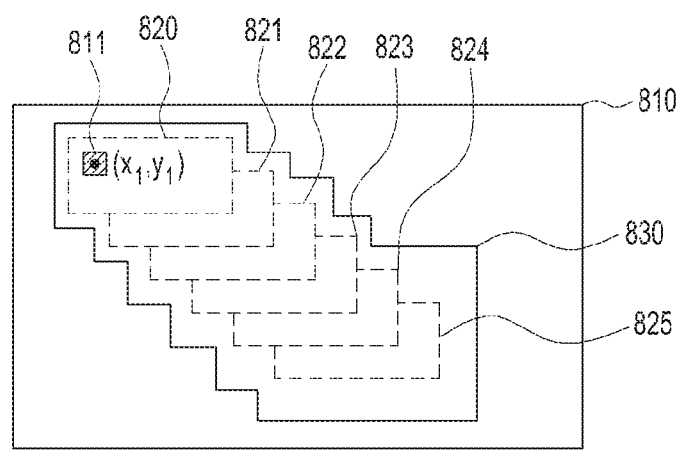
FIG. 8B illustrates a decoding-target part of an entire image according to an embodiment of the present disclosure.

FIG. 8B illustrates a decoding-target part of an entire image according to an embodiment of the present disclosure.

Referring to FIGS. 7, 8A, and 8B, in step 710, the electronic device 101 determines a first part 820 corresponding to a user gaze on a first frame 810 at a first time t1, as illustrated in FIG. 8A. Hereinafter, an indication that the electronic device 101 is capable of executing a predetermined operation may indicate that the processor 120 of the electronic device 101 performs a predetermined operation or the processor 120 controls another piece of hardware to perform a predetermined operation. In this case, an ordinal number "first" used in the term "first frame 810" may indicate a number for distinguishing a plurality of frames included in a video. Ordinal numbers written before frames indicate frames.

For example, the electronic device 101 may previously store or stream the first frame 810 and a second frame 850, as shown in FIG. 8A. According to an embodiment of the present disclosure, the first frame 810 may be an I-frame (infra-frame) and the second frame 850 may be a P-frame (previous frame or predicted frame). In this case, the P-frame may indicate a previous frame or a frame that is decoded by being predicted using a subsequent frame. The first frame 810 may include a first block 811 and a second block 812. The second frame 850 may include a third block 851 and a fourth block 852. The third block 851 may be predicted by referring to, for example, the first block 811 of the first frame 810. In addition, the fourth block 852 may be predicted by referring to, for example, the second block 812 of the first frame 810.

The electronic device 101 may determine a user gaze at a current time. For example, the electronic device 101 may determine information associated with a direction in which the electronic device 101 is tilted, using sensing data obtained by a gyro sensor or a geomagnetic sensor. The electronic device 101 may determine a user gaze using information associated with a direction in which the electronic device 101 is tilted. Accordingly, the electronic device 101 may determine the first part 820 corresponding to the user gaze. The electronic device 101 may previously store correlation information associated with a display-target part and a quantitative numerical value for indicating a user gaze (e.g., a numerical value or sensing data associated with a direction in which the electronic device 101 is tilted). The electronic device 101 may compare the previously stored correlation information and sensing data, and may determine the first part 820 corresponding to a user gaze. According to an embodiment of the present disclosure, the electronic device 101 may be configured to display a defaulted part if a predetermined application is executed. That is, the electronic device 101 may display a part set by a producer, irrespective of a direction in which the electronic device 101 is initially tilted.

A user may turn his/her head with the electronic device 101 to gaze at the bottom right side 801. Accordingly, the direction of a tilt of the electronic device 101 may be changed. The electronic device 101 may determine a third part 860 corresponding to a user gaze in the second frame 850 based on the changed direction of the tilt. Alternatively, the electronic device 101 may determine the third part 860 corresponding to the user gaze in the second frame 850 using movement information of the electronic device 101 (e.g., an angular acceleration, an angular speed, a linear acceleration, a linear speed, and the like). Alternatively, the electronic device 101 may photograph a landscape, and may determine movement information of the electronic device 101 using a result obtained from photographing.

In this instance, to enable the electronic device 101 to display the third part 860, the fourth block 852 included in the third part 860 needs to be predicted. Accordingly, the second block 812, which is a reference block to be used for the electronic device 101 to predict the fourth block 852, needs to be decoded in advance. If the electronic device 101 decodes only the first part 820 corresponding to a user gaze, the reference block to be used for the electronic device 101 to predict the fourth block 852 in the second frame 850 does not exist, and thus, the fourth block 852 may not be accurately decoded. In addition, although the electronic device 101 decodes a part 870 larger than the first part 820, the fourth block 852 may not be predicted. Accordingly, the electronic device 101 may decode a part that is greater than or equal to the first part 820 corresponding to a current user gaze, that is, the second part 830 of FIG. 8B, thereby predicting a part corresponding to a user gaze on a subsequent frame. According to an embodiment of the present disclosure, the electronic device 101 may decode only the second part 830, that is, a decoding-target part, as opposed to the entire image, by using a video codec, such as a high efficiency video codec (HEVC) tile structure. For example, the electronic device 101 may detect an acceleration in the bottom right direction at a first time. Accordingly, it may be predicted that a user gaze may gradually change in the bottom right direction at a second time, a third time, and a fourth time. Accordingly, the electronic device 101 may determine areas in the relatively bottom right direction of the first part 820 corresponding to a current user gaze, as parts 821, 822, 823, 824, and 825 corresponding to a future user gaze. The future user gaze may indicate user gazes corresponding to subsequent frames of the first frame 810.

As described above, in step 720, the electronic device 101 may decode the second part 830 which includes the first part 820, and has a size greater than or equal to the first part 820. The second part 830 may include the second block 812. For example, the electronic device 101 may decode the second part 830 including the first part 820, which corresponds to a current user gaze, as illustrated in FIG. 8B. According to an embodiment of the present disclosure, the electronic device 101 may predict a future user gaze, and may determine the second part 830 which is a decoding-target part, using the same. In this case, the future user gaze may correspond to parts to be displayed at times for subsequent frames based on the current time t1. For example, the direction of a gaze corresponding to the third part 860 at the second time t2 may be referred to as a future user gaze. The electronic device 101 may predict a future user gaze or a part corresponding to a future user gaze, that is, the third part 860, in various methods. That is, the term "current" or "future" may be used based on the order of frames.

For example, as illustrated in FIG. 8B, the electronic device 101 may determine the second part 830, which includes the part 820 corresponding to a current user gaze and the parts 821 to 825 corresponding to a future user gaze, as a decoding-target part. For example, the electronic device 101 may predict a tilted state of the electronic device 101 in the future based on the movement information of the electronic device 101 measured at the current time. The electronic device 101 may predict a tilted state of the electronic device 101 at each of the second time, the third time, the fourth time, and the like, and the parts corresponding to the tilted states may be determined as parts 821 to 825 corresponding to a future user gaze.

Alternatively, the electronic device 101 may determine a decoding-target part using user information such as a behavioral habit of a user, and the like. For example, the electronic device 101 may previously store a user behavioral habit of frequently gazing at the bottom side. Accordingly, the electronic device 101 may predict a downward part from a current user gaze as a future user gaze. In addition, the electronic device 101 may determine a decoding-target part using information related to contents of content, such as metadata of content. Various methods for predicting a future user gaze are described below in greater detail. In step 730, the electronic device 101 may display the first part 820. In addition, the electronic device may determine a decoding-target part using at least one of the height of a user gaze, the direction of a user gaze, the speed of a change of a user gaze direction, the acceleration of a change of a user gaze direction, the speed of a user movement, the acceleration of a user movement, and the direction of a user movement. Additionally, the electronic device 101 may determine a decoding-target part based on at least one of an importance of an image, an importance of an object in an image, a data bandwidth during streaming, a decoding complexity, a power consumption, a quality of an output image, user state information, and a gaze range prediction error of a previous decoded image. For example, the user state information may be information obtained if data obtained from various sensors in the electronic device 101 is accumulated. According to an embodiment of the present disclosure, the user state information may include only user gaze information. The user state information may include another piece of information in addition to the user gaze information.

According to an embodiment of the present disclosure, the electronic device 101 may determine a decoding-target part based on a delay between a time when decoding is performed and a time when a decoded image is actually displayed. For example, the electronic device 101 may predict a user gaze at the time when the decoded image is displayed as a future user gaze, and may determine a decoding-target part corresponding to the future user gaze. In addition, the electronic device 101 may determine a decoding-target part using a delay occurring until sensing data is received from a movement sensor.

In step 740, the electronic device 101 may determine the third part 860 corresponding to a user gaze on the second frame 850 at the second time t2. In step 750, the electronic device 101 may decode a fourth part, which includes the third part 860 and has a size greater than or equal to the third part 860, using at least one block of the second part 830. In this case, the electronic device 101 may predict the fourth block 852 of the third part 860 using the second block 812 of the first frame 810. The electronic device 101 may perform inter-prediction. The second block 812 may be decoded in advance by being included in the second part 830 which is the decoding-target part of the first frame 810. Accordingly, the electronic device 101 may predict the fourth block 852 using the decoded second block 812. The electronic device 101 may perform prediction by referring to an I-frame after the second frame 850. According to an embodiment of the present disclosure, the electronic device 101 may decode only the third part 860 corresponding to a user gaze, with respect to a non-reference frame which is not additionally used for prediction.

In step 760, the electronic device 101 may display the third part 860. Accordingly, the electronic device 101 may decode only a part of the entire image, thereby performing decoding with a relatively lesser amount of resources as compared to decoding all of the blocks of the entire image. In addition, as the electronic device 101 predicts a future user gaze and determines a decoding-target part, a reference block (e.g., the second block 812 of the first frame 810) for prediction may not be excluded from decoding.

The electronic device 101 according to an embodiment of the present disclosure may perform partial-decoding at the same time while displaying an image corresponding to a user gaze. Alternatively, the electronic device 101 may previously perform partial-decoding with respect to frames of a video and may store the same, and later, may display a screen corresponding to a user gaze.

The electronic device 101 may perform partial-decoding with respect to a subsequent frame of the second frame 850. In this case, the electronic device 101 may predict a part corresponding to a future user gaze based on the part 860 corresponding to a user gaze on the second frame 850, and may perform partial-decoding. In addition, if an independent decoding refresh (IDR) picture appears in frames, the electronic device 101 may discard existing user gaze prediction information, and may begin a new user gaze prediction.

Although FIG. 8 is used to describe prediction associated with a P picture, this is merely an example, and the electronic device 101 may predict a B picture according to an embodiment of the present disclosure. The I picture, the P picture, and the B picture in FIG. 8 are merely for illustrative purposes, and those skilled in the art may readily understand that technologies that decode a predetermined frame by referring to a previous frame could be used without limitation. In addition, the above embodiment is described as if a predetermined block of the second frame 850 is predicted by referring to the first frame 810. This is merely an example. Furthermore, the electronic device 101 may predict a block of the second frame 850 using the first frame 810 and a previous frame of the first frame 810 (e.g., a plurality of reference frames) for the second frame's 850 reference.

Figure 9:
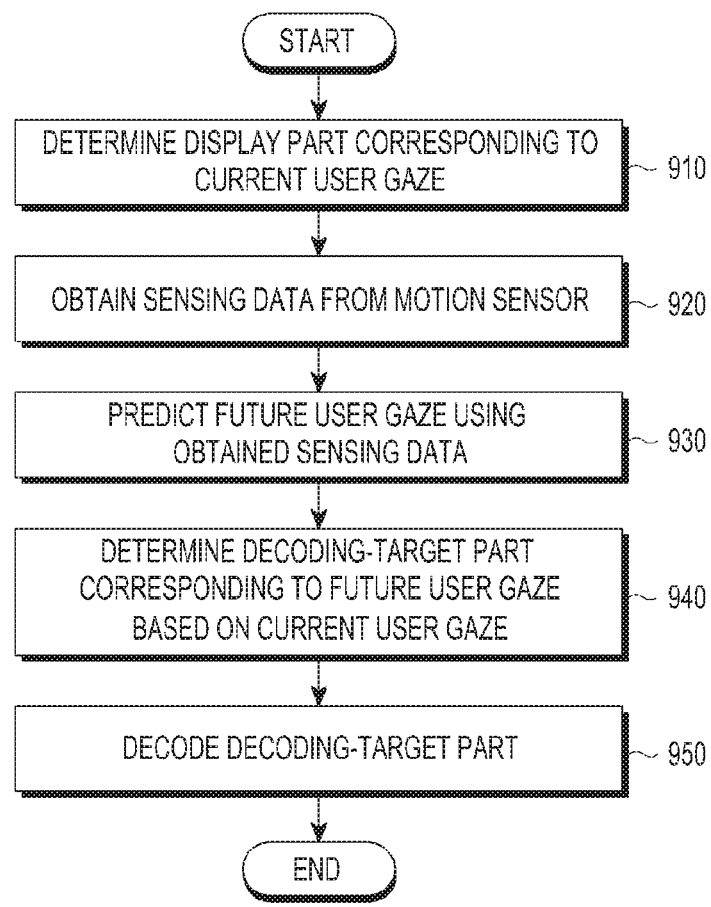
FIG. 9 is a flowchart of a method of predicting a future user gaze according to an embodiment of the present disclosure.

FIG. 9 is a flowchart of a method of predicting a future user gaze according to an embodiment of the present disclosure. FIG. 9 is described below in greater detail with reference to FIG. 10.

Figure 10:
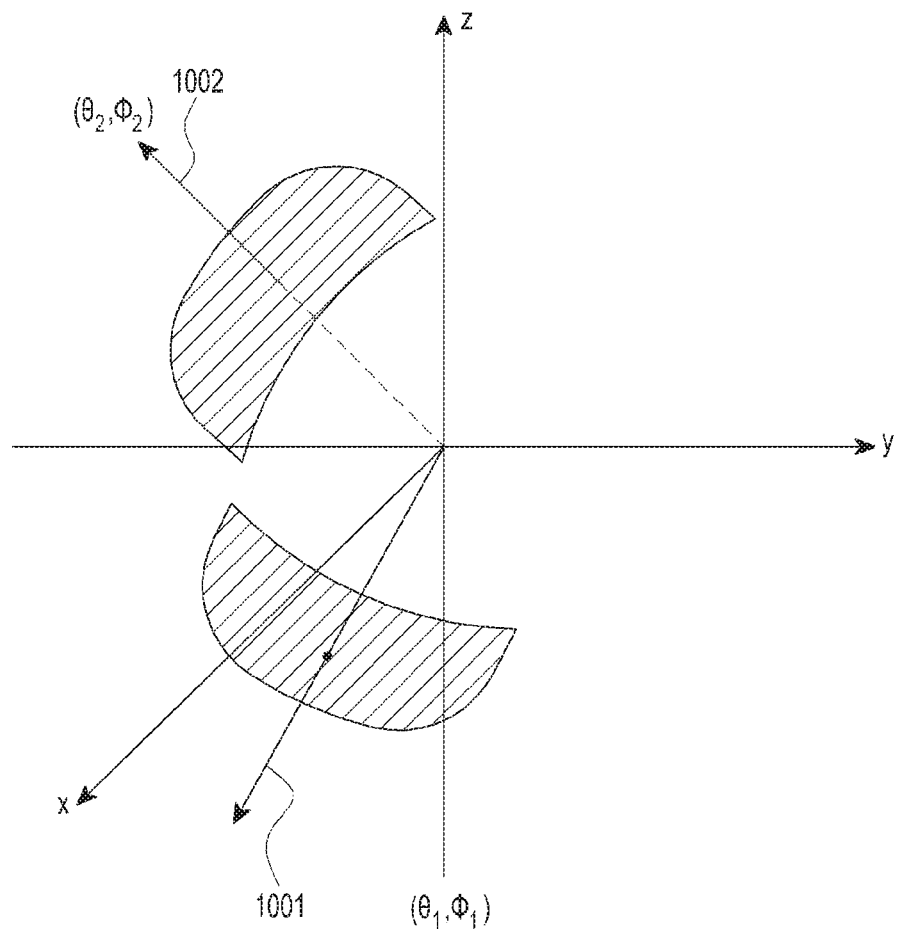
FIG. 10 illustrates a process of predicting a future user gaze according to an embodiment of the present disclosure.

FIG. 10 illustrates a process of predicting a future user gaze according to an embodiment of the present disclosure.

Referring to FIGS. 9 and 10, in step 910, the electronic device 101 determines a display part corresponding to a current user gaze. For example, the electronic device 101 may face a first direction 1001 ($\theta 1$, $\varphi 1$) at a first time t1. The electronic device 101 may determine tilt information of the electronic device 101 using, for example, sensing data of a gyro sensor, sensing data of a geometrical sensor, and the like. Accordingly, angle information ($\theta 1$, $\varphi 1$) of a direction in which the electronic device 101 faces may be determined. The electronic device 101 may determine a display part corresponding to the determined angle information ($\theta 1$, $\varphi 1$). Alternatively, the electronic device 101 may display a default screen if a predetermined application starts.

In step 920, the electronic device 101 obtains sensing data from a motion sensor. For example, a user may turn his/her head while wearing the electronic device 101. Accordingly, the electronic device 101 may face a second direction ($\theta 2$, $\varphi 2$) 1002 at a second time t2. The electronic device 101 may determine tilt information, for example, angle information ($\theta 2$, $\varphi 2$) of the direction in which the electronic device 101 faces, using the sensing data. In step 930, the electronic device 101 may predict a future user gaze using the obtained sensing data. For example, the electronic device 101 may determine a user gaze at a third time, based on a difference between the first direction 1001 and the second direction 1002. In addition, the electronic device 101 may determine a user gaze at a later time. According to an embodiment of the present disclosure, the electronic device 101 performs interpolation or extrapolation of data measured during the time of measurement, and may determine a user gaze at a future time, in which measurement is not performed. The electronic device 101 may determine a user gaze at a future time based on measured data by applying various interpolation methods. Alternatively, the electronic device 101 may predict a future user gaze based on information associated with an acceleration, an angular acceleration, a speed, and an angular speed measured by a linear sensor or a gyro sensor included in a sensor.

In step 940, the electronic device 101 may determine a decoding-target part corresponding to a future user gaze, based on a current user gaze. In step 950, the electronic device 101 may decode the decoding-target part. The electronic device 101 may determine a part which includes the future user gaze and has a size greater than or equal to the future user gaze, in addition to a part corresponding to the future user gaze, as the decoding-target part. For example, as illustrated in FIG. 8B, the electronic device 101 may determine the part 830 that includes the part 821 to 825 corresponding to the future user gaze, and has a size greater than or equal to the part 821 to 825, as the decoding-target part. The electronic device 101 may determine a part that additionally includes a predetermined number of pixels from the boundary of the part 821 to 825 corresponding to the future user gaze, as the decoding-target part. The number of pixels added may be a predetermined number of pixels or may be variable based on the reliability of a future user gaze, which is described below in greater detail. The electronic device 101 may exclude at least one of the determined decoding-target blocks, or may add a block.

Figure 11:
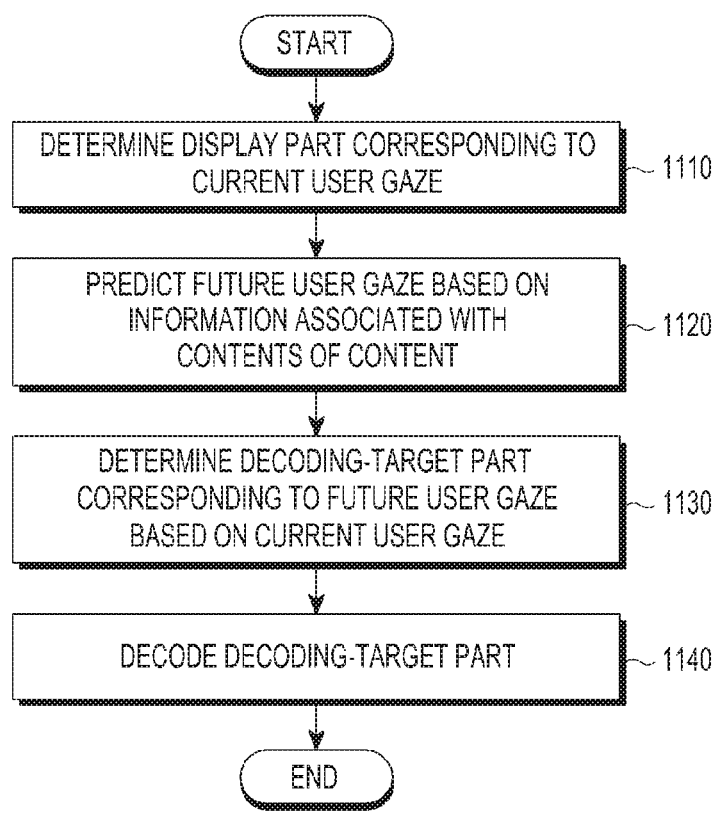
FIG. 11 is a flowchart of a method of predicting a future user gaze according to an embodiment of the present disclosure.

FIG. 11 is a flowchart of a method of predicting a future user gaze according to an embodiment of the present disclosure. FIG. 11 is described below in greater detail with reference to FIG. 12.

Figure 12:
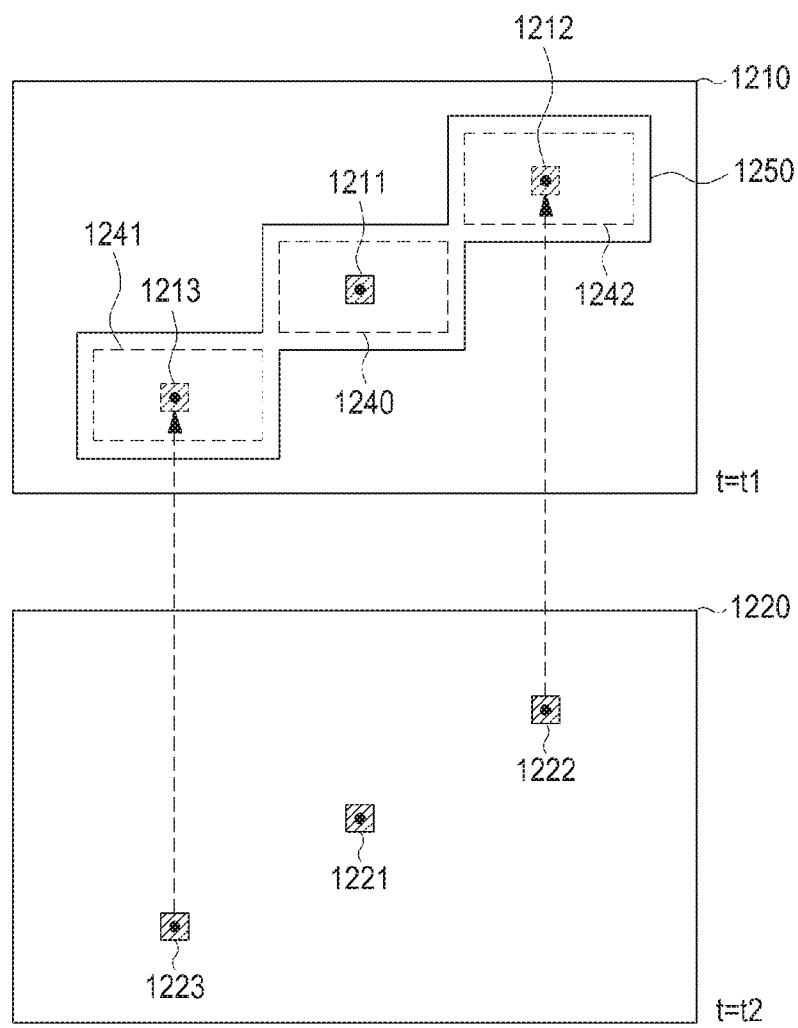
FIG. 12 illustrates a process of predicting a future user gaze according to an embodiment of the present disclosure.

FIG. 12 illustrates a process of predicting a future user gaze according to an embodiment of the present disclosure.

Referring to FIGS. 11 and 12, in step 1110, the electronic device 101 determines a display part corresponding to a current user gaze. For example, as illustrated in FIG. 12, a video may include a first frame 1210 and a second frame 1220. The first frame 1210 may include a first block 1211, a second block 1212, and a third block 1213. The second frame 1220 may include a fourth block 1221, a fifth block 1222, and a sixth block 1223. The electronic device 101 may determine a first part 1240 including the first block 1211 of the first frame 1210 as a display part corresponding to a current user gaze. As described above, the electronic device 101 may predict a block of the second frame 1220 using a block of the first frame 1210. For example, the fifth block 1222 may be predicted with reference to the second block 1212. The sixth block 1223 may be predicted with reference to the third block 1213.

In step 1120, the electronic device 101 may predict a future user gaze based on information relating to the contents of content. For example, a new object may be included in the fifth block 1222 of the second frame 1220. Alternatively, the video may be produced to reproduce a predetermined sound at a location of the second frame 1220, which corresponds to the sixth block 1223. The video according to an embodiment of the present disclosure may be produced to reproduce a sound in a predetermined direction. Accordingly, there is a high probability that a user gazes at a part in which the new object is disposed or the direction in which the predetermined sound is reproduced, at a point in time in which the second frame 1220 reproduces. The electronic device 101 may predict a part 1242 corresponding to the second block 1212 and a part 1241 corresponding to the third block 1213, which have a high probability of being gazed at by the user, as a part corresponding to a future user gaze. The video may include frames in which a change of a user gaze is expected, and location information, as meta information. The electronic device 101 may predict a future user gaze using meta information.

In step 1130, the electronic device 101 may determine a decoding-target part corresponding to a future user gaze, based on a part corresponding to a current user gaze. For example, as illustrated in FIG. 12, the electronic device 101 may determine a part 1250 including a part 1240 corresponding to the current gaze and the parts 1241 and 1242 corresponding to a future user gaze, as the decoding-target part. In step 1140, the electronic device 101 decodes the decoding-target part.

According to an embodiment of the present disclosure, the electronic device 101 may predict a future user gaze using sensing data obtained from a motion sensor as illustrated in FIG. 9 and information associated with the contents of content as illustrated in FIG. 11.

Figure 13:
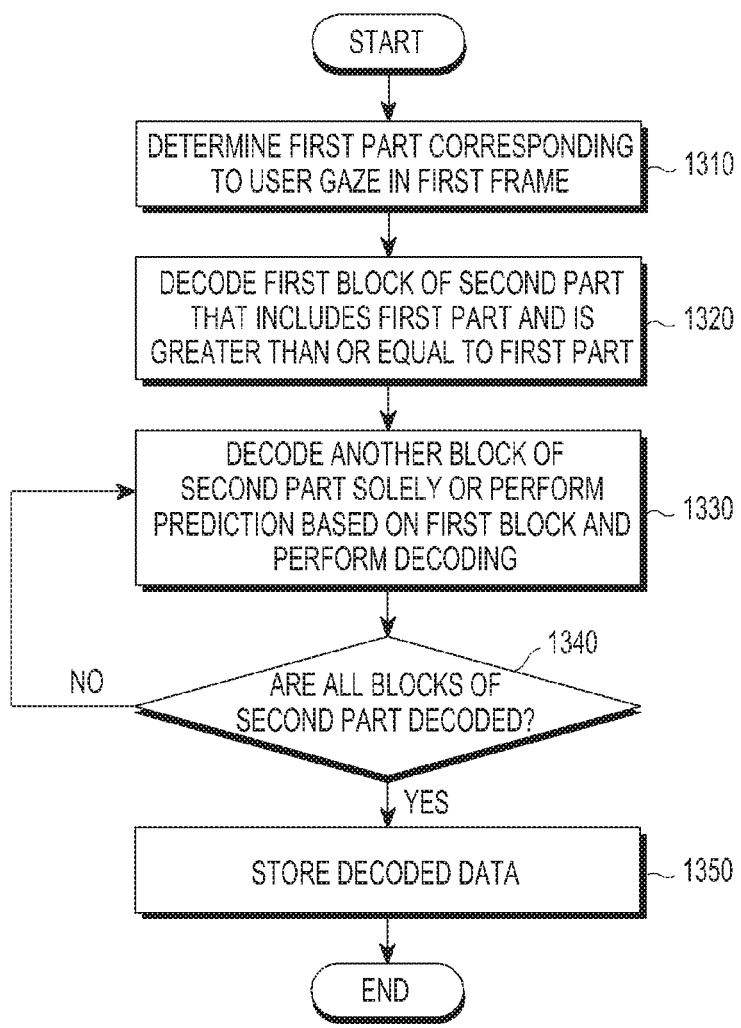
FIG. 13 is a flowchart of an intra-prediction method according to an embodiment of the present disclosure.

FIG. 13 is a flowchart of an intra-prediction method according to an embodiment of the present disclosure. FIG. 13 is described below in greater detail with reference to FIG. 14.

Figure 14:
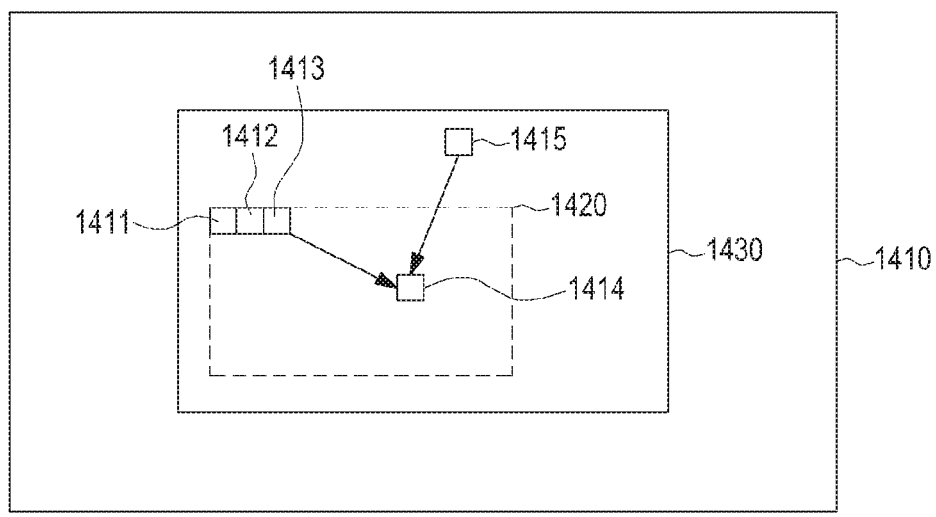
FIG. 14 illustrates an intra-prediction process according to an embodiment of the present disclosure.

FIG. 14 illustrates an intra-prediction process according to an embodiment of the present disclosure.

Referring to FIGS. 13 and 14, in step 1310, the electronic device 101 may determine a first part 1420 corresponding to a user gaze on a first frame 1410, as illustrated in FIG. 14. In step 1320, the electronic device 101 may decode a first block 1415 of a second part 1430, which includes the first part 1420 and is greater than or equal to the first part 1420.

In step 1330, the electronic device 101 may decode the blocks 1411, 1412, 1413, and 1414 of the first block 1420 independently, or may perform prediction based on a first block 1415 of the second part 1430 and may perform decoding. For example, the electronic device 101 may decode the blocks 1411, 1412, and 1413 of the first part 1420 independently. In addition, the electronic device 101 may predict the block 1414 of the first part 1420 using the block 1413 of the first part 1420 or the block 1415 of the second part 1430. The electronic device 101 according to an embodiment of the present disclosure may perform prediction based on an adjacent sample value of a decoding-target block, and may perform combined-prediction included in a video coding format VP9 or intra block copy such as screen content coding (SCC) extension, that is, prediction in a manner of combining two or more prediction by applying a weight.

If the electronic device 101 decodes only the first part 1420 corresponding to a user gaze, the block 1414 may not be predictable in the decoding process since the block 1415, which is a reference block for predicting the block 1414, is not decoded in advance, The electronic device 101 according to an embodiment of the present disclosure may decode a part that is greater than or equal to a part corresponding to a user gaze, and thus, the electronic device 101 may more accurately decode the blocks in the part 1420 corresponding to the user gaze.

The electronic device 101 may determine whether all of the blocks of the second part are decoded in step 1340, and if all of the blocks are decoded, the electronic device 101 may store the decoded data in step 1350.

As described above, the electronic device 101 according to an embodiment of the present disclosure may decode a part that is greater than or equal to a part corresponding to a user gaze, and thus, accurate decoding may be performed even if intra-prediction is performed.

Figure 15:
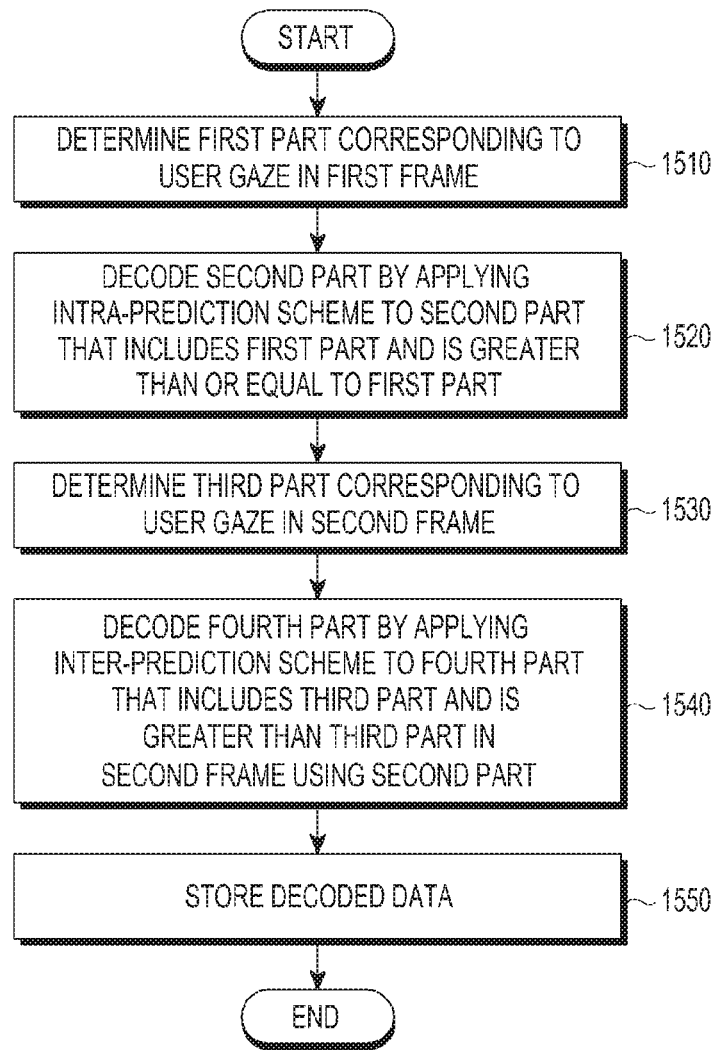
FIG. 15 is a flowchart of a control method of an electronic device according to an embodiment of the present disclosure.

FIG. 15 is a flowchart of a control method of an electronic device according to an embodiment of the present disclosure.

Referring to FIG. 15, in step 1510, the electronic device 101 may determine a first part corresponding to a user gaze in a first frame. In step 1520, the electronic device 101 may decode a second part by applying an intra-prediction scheme to the second part that includes the first part and is greater than or equal to the first part. For example, the electronic device 101 may perform partial-decoding based on intra-prediction in a single frame, using the process as illustrated in FIG. 13.

In step 1530, the electronic device 101 may determine a third part corresponding to a user gaze in a second frame. In step 1540, the electronic device 101 may decode a fourth part, which includes the third part and is greater than or equal to the third part in the second frame, by applying an inter-prediction scheme to the fourth part using the second part. For example, the electronic device 101 may perform partial-decoding based on inter-prediction as illustrated in FIG. 7. In step 1550, the electronic device 101 may store decoded data, and may display the decoded data in response to a change of a user gaze. That is, the electronic device 101 may perform partial-decoding using both inter-prediction and intra-prediction. According to an embodiment of the present disclosure, the electronic device 101 may determine an intra-screen prediction mode to minimize the cost of rate-distortion of intra-prediction, and may perform intra-prediction using the same. Alternatively, the electronic device 101 may determine a motion vector of a current block using the motion vector of a neighboring block, and may perform inter-prediction using the same.

Figure 16:
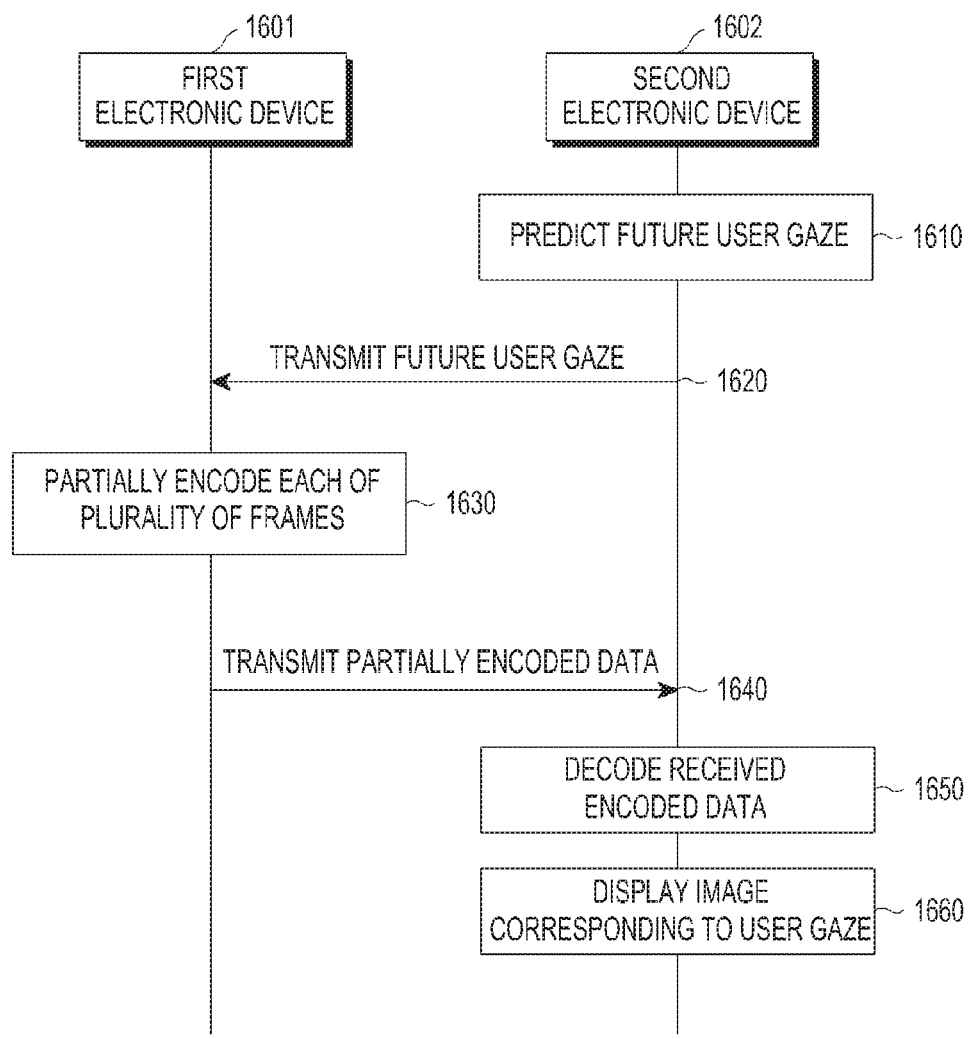
FIG. 16 is a flow diagram of a control method of an electronic device that performs encoding according to an embodiment of the present disclosure.

FIG. 16 is a flow diagram of a control method of an electronic device that performs encoding according to an embodiment of the present disclosure.

Referring to FIG. 16, a first electronic device 1601 may perform encoding, and a second electronic device 1602 may perform decoding.

In step 1610, the second electronic device 1602 predicts a future user gaze. In step 1620, the second electronic device 1602 may transmit the future user gaze to the first electronic device 1601. According to an embodiment of the present disclosure, the second electronic device 1602 may transmit sensing data obtained by the motion sensor to the first electronic device 1601. In this case, the first electronic device 1601 may predict a future user gaze using the received sensing data.

In step 1630, the first electronic device 1601 may perform partial-encoding of each of the plurality of frames. The first electronic device 1601 may determine a part which is greater than or equal to a part corresponding to the future user gaze as an encoding-target part, and may perform partial-encoding. The first electronic device 1601 may determine the encoding-target part using the above-described decoding-target part determining process. In step 1640, the first electronic device 1601 may transmit the partially encoded data. In step 1650, the second electronic device 1602 may decode the received encoded-data. The second electronic device 1602 may decode the entirety of the received encoded-data, or may decode a part of the received encoded-data. In step 1660, the second electronic device 1602 may display an image corresponding to a user gaze.

Figure 17:
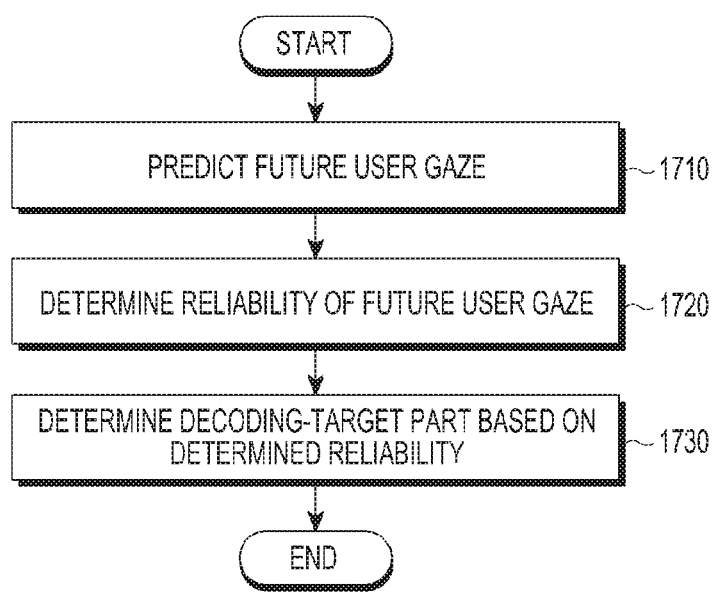
FIG. 17 is a flowchart of a control method of an electronic device according to an embodiment of the present disclosure.

FIG. 17 is a flowchart of a control method of an electronic device according to an embodiment of the present disclosure. FIG. 17 is described below in greater detail with reference to FIG. 18.

Figure 18:
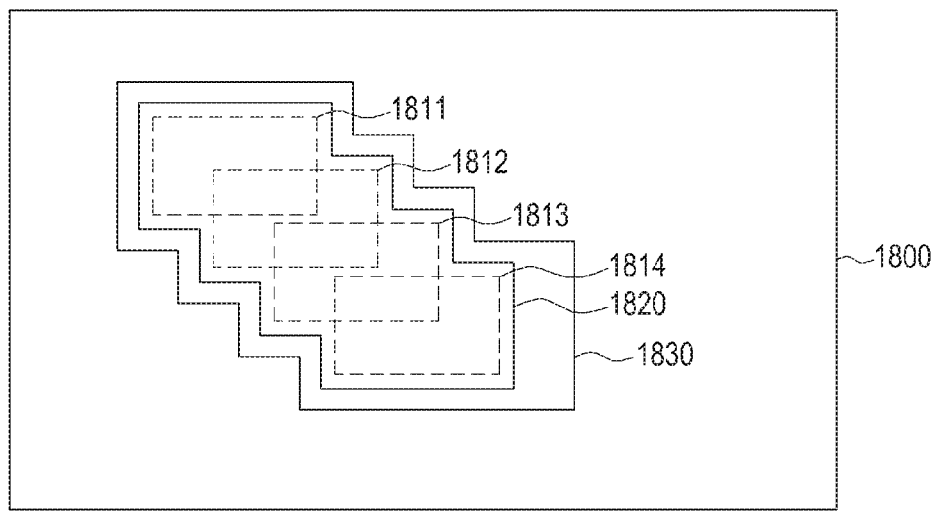
FIG. 18 illustrates a decoding-target part based on a reliability of a future user gaze according to an embodiment of the present disclosure.

FIG. 18 illustrates a decoding-target part based on reliability of a future user gaze according to an embodiment of the present disclosure.

Referring to FIGS. 17 and 18, in step 1710, the electronic device 101 may predict a future user gaze. In step 1720, the electronic device 101 may determine the reliability of the future user gaze. The electronic device 101 may apply various existing reliability calculation algorithms to the future user gaze predicted based on the sensing data. For example, the electronic device 101 may calculate a reliability by comparing information associated with the predicted user gaze and information associated with an actual user gaze. Alternatively, the electronic device 101 may calculate the reliability using information associated with the predicted user gaze. The electronic device 101 may determine the reliability associated with the future user gaze based on a result obtained by applying the algorithm.

In step 1730, the electronic device 101 may determine a decoding-target part based on the determined reliability. For example, the electronic device 101 may predict parts 1812 to 1814 corresponding to the future user gaze based on a part 1811 corresponding to a current user gaze. If it is determined that the reliability of the future user gaze is relatively high, the electronic device 101 may determine, as the decoding-target part, a part 1820 obtained by adding a lesser part than the parts 1812 to 1814 corresponding to the future user gaze. Alternatively, if it is determined that the reliability of the future user gaze is relatively low, the electronic device 101 may determine, as the decoding-target part, a part 1830 obtained by adding a part relatively greater than or equal to the parts 1812 to 1830 corresponding to the future user gaze. The electronic device 101 may store correlation information associated with at least one of the size and the direction of a part to be added as the decoding-target part and the reliability of a future user gaze. The electronic device 101 may determine the additional part by comparing the determined reliability of the future user gaze and the correlation information, and may determine the decoding-target part using the additional part and the part corresponding to the future user gaze.

Figure 19:
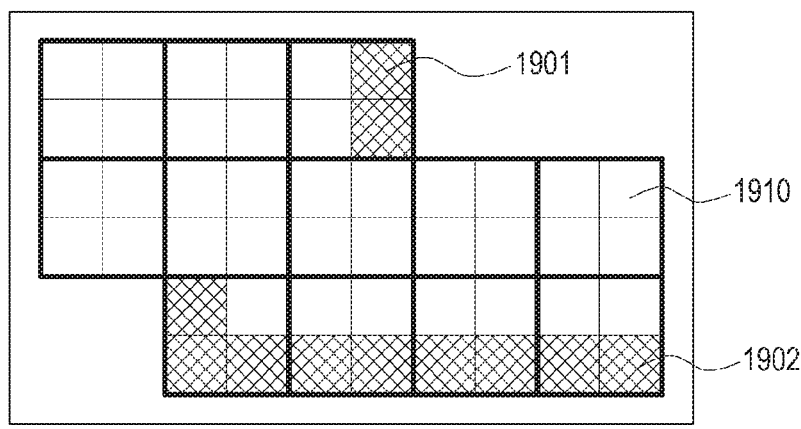
FIG. 19 illustrates decoding overhead.

FIG. 19 illustrates decoding overhead.

Referring to FIG. 19, the electronic device 101 may determine a decoding-target part 1910 using, for example, a future user gaze. If the electronic device 101 sets a block size to a size of 2×2, the electronic device 101 may need to perform decoding with respect to overhead parts 1901 and 1902 that exceed the decoding-target part 1910. The electronic device 101 according to an embodiment of the present disclosure may set variable block sizes for decoding, thereby suppressing the occurrence of a decoding overhead.

Figure 20:
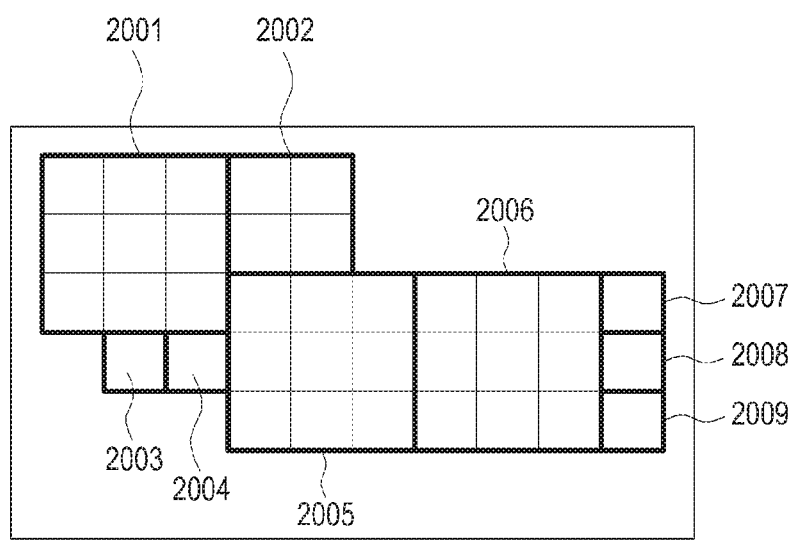
FIG. 20 illustrates a variable block size setting according to an embodiment of the present disclosure.

FIG. 20 illustrates a variable block size setting according to an embodiment of the present disclosure.

Referring to FIG. 20, the electronic device 101 may set blocks 2001, 2005, and 2006 having a first size, to which decoding is to be performed, to have a size different from the size of a block 2002 having a second size and the size of blocks 2003, 2004, 2007, 2008, and 2009 having a third size. The electronic device 101 may divide the decoding-target part into squares in different sizes. Accordingly, the occurrence of a decoding overhead may be suppressed. Alternatively, the electronic device 101 may set blocks to have different sizes when performing encoding.

According to an embodiment of the present disclosure, the electronic device 101 may set the size of a block to be different based on the accuracy of a future user gaze. For example, a block may be set to have the same or a greater size with respect to a future user gaze having a relatively high reliability. A block may be set to have a lesser size with respect to a future user gaze having a relatively low reliability. For example, the electronic device 101 may set a block having the same or a greater size with respect to a part where future user gazes overlap each other. The electronic device 101 may set a block having a relatively lesser size with respect to a part where future user gazes do not overlap.

Figure 21:
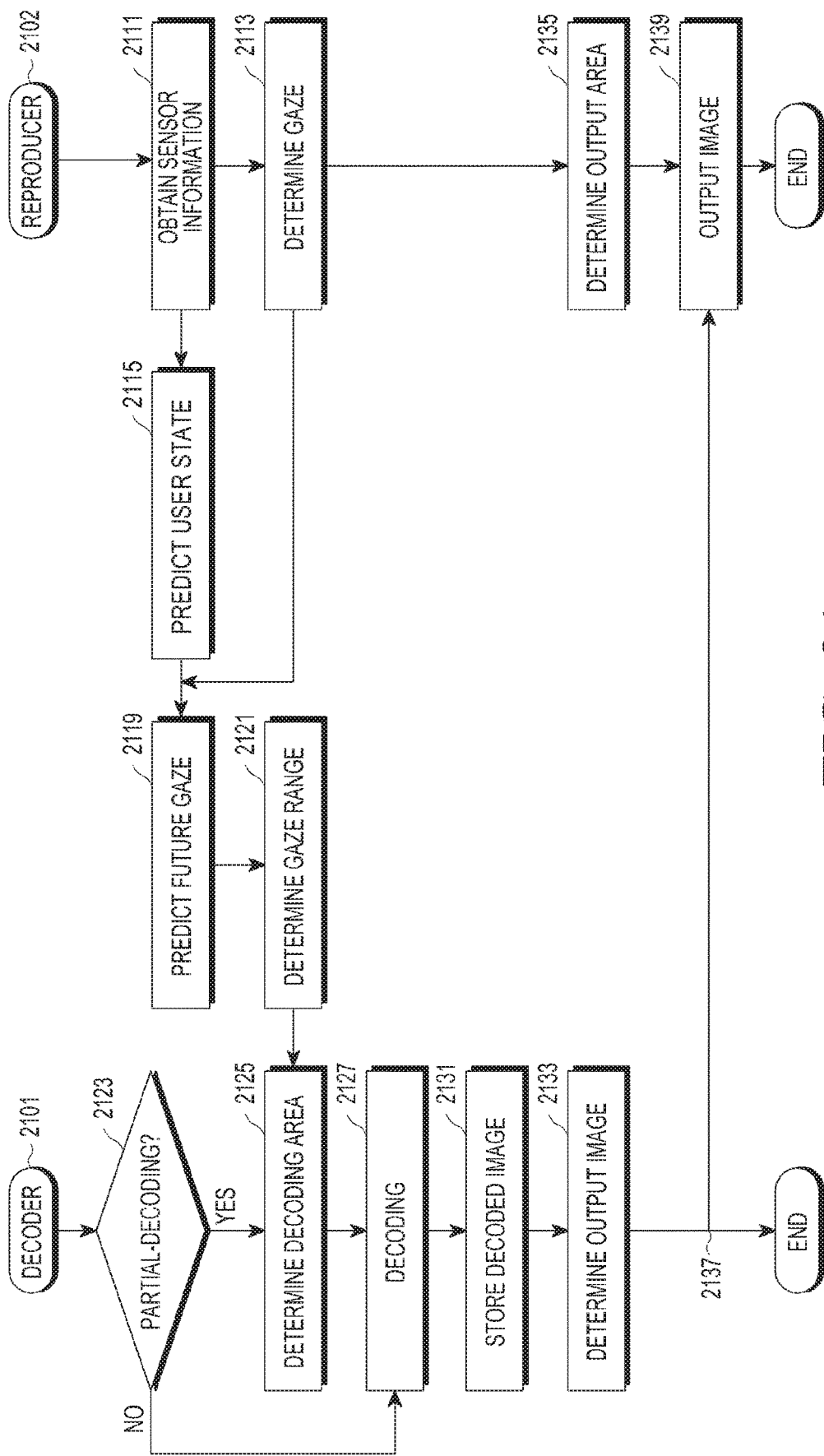
FIG. 21 is a flowchart of a control method of an electronic device according to an embodiment of the present disclosure.

FIG. 21 is a flowchart of a control method of an electronic device according to an embodiment of the present disclosure.

Referring to FIG. 21, a decoder 2101 and a reproducer 2102 operate independently. The decoder 2101 and the reproducer 2102 may be separated hardware-wise. In this case, communication may be performed between the decoder 2101 and the reproducer 2102 in a wired or wireless manner According to an embodiment of the present disclosure, the decoder 2101 and the reproducer 2102 may be included in a single electronic device.

In step 2111, the reproducer 2102 may obtain sensor information. In step 2113, the reproducer 2102 may determine the direction of a current user gaze. The reproducer 2102 may predict a user state using sensor information in step 2115. The user state information may be information associated with the direction of a future user gaze, for example, information associated with a user movement. The user state information may be obtained based on accumulated sensor information, may include only the direction of a user gaze, or may be configured to further include other information. The reproducer 2102 may predict a future user gaze using the user state information based on the current user gaze in step 2119, and the reproducer 2102 may determine a gaze range, that is, a part corresponding to the future user gaze, in an entire image based on the future user gaze in step 2121. According to an embodiment of the present disclosure, the decoder 2101 may predict a future user gaze based on a current user gaze, and may determine a gaze range.

In step 2123, the decoder 2101 may determine whether to perform partial-decoding. If the decoder 2101 determines not to perform partial-decoding, the decoder 2101 may decode all of the blocks in the image in step 2127. If it is determined that partial-decoding is to be performed, the decoder 2101 may determine a decoding part using the gaze range in step 2125. In step 2127, the decoder 2101 may decode the determined decoding part. In step 2131, the decoder 2101 may store a decoded image. The decoder 2101 may perform partial-decoding by referring to the decoded image which is stored in advance. The decoder 2101 may determine an output image in step 2133, and may transmit the output image to the reproducer 2102 in step 2137. The reproducer 2102 may determine an output area in step 2135, and may output an image in step 2139.

Figure 22:
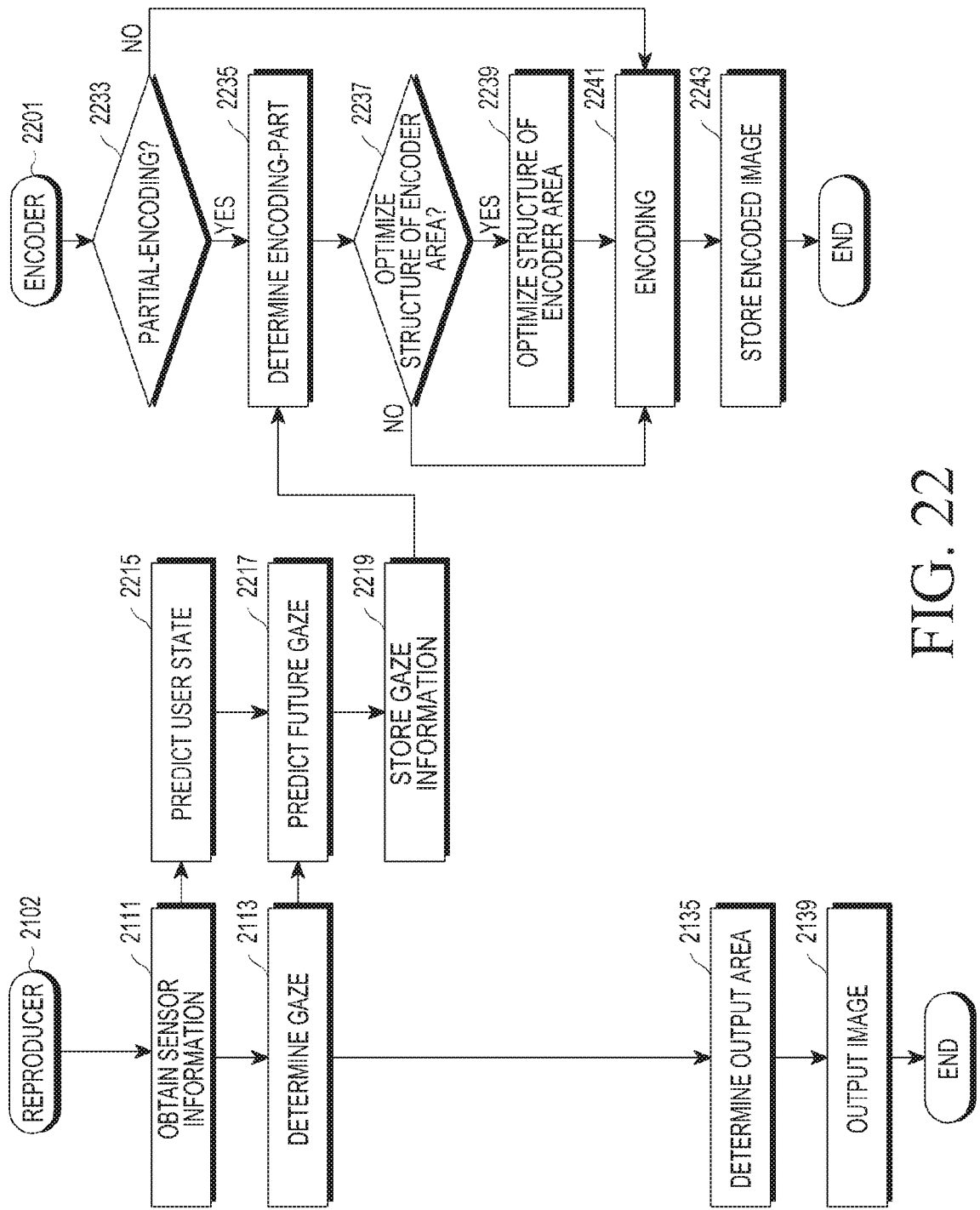
FIG. 22 is a flowchart of a method of an encoder and a reproducer according to an embodiment of the present disclosure.

FIG. 22 is a flowchart of a method of operations of an encoder and a reproducer according to an embodiment of the present disclosure. A detailed description of the steps that are illustrated in FIG. 21 is omitted in the description below of the steps of FIG. 22.

Referring to FIG. 22, an encoder 2201 and the reproducer 2102 operate independently. The encoder 2201 and the reproducer 2102 may be separated hardware-wise. In this case, communication may be performed between the encoder 2201 and the reproducer 2102 in a wired or wireless manner According to an embodiment of the present disclosure, the encoder 2201 and the reproducer 2102 may be included in a single electronic device.

The reproducer 2102 or the encoder 2201 may predict a user state using sensor information in step 2215. In step 2217, the reproducer 2102 or the encoder 2201 may predict a future user gaze. In step 2219, the reproducer 2102 or the encoder 2201 may determine a gaze range and store gaze information. The encoder 2201 may determine whether to perform a partial-encoding in step 2233. If the encoder 2201 determines not to perform partial-encoding, the encoder 2201 may encode all of the blocks in step 2241. If the encoder 2201 determines to perform partial-encoding, the encoder 2201 may determine an encoding part using, for example, a gaze range that is based on a future user gaze, in step 2235. For example, the encoder 2201 may determine, as the encoding-target part, a decoding-target part determined based on a decoding-target part determining method. Alternatively, the encoder 2201 may determine a part that includes a decoding-target part and has a size greater than or equal to the decoding-target part, as the encoding-target part. For example, the encoder 2201 may determine a user gaze on a frame to be encoded from a user gaze determined by a decoding device or an electronic device by taking into consideration a delay between a point in time when a decoded image is displayed in the reproducer 2102 and a point in time when encoding is performed. For example, the encoder 2201 may obtain information associated with a current user gaze of a user, and may obtain a user gaze on a first frame using the current user gaze. The encoder 2201 may obtain the user gaze on the first frame by taking into consideration a delay between a point in time when displaying is actually performed and a point in time when encoding is performed. In addition, the encoder 2201 may predict information associated with a future user gaze, and may determine a user gaze on at least one frame after the first frame. In this case, the encoder 2201 may determine the user gaze on the at least one frame after the first frame by taking into consideration a delay between a point in time of encoding and a point in time of displaying. That is, the encoder 2201 may determine an encoding-target part based on a delay between a point in time if a decoded image is actually displayed and a point in time when encoding is performed. For example, the encoder 2201 may determine the encoding-target part by taking into consideration at least one of a delay occurring until movement information from a sensor is received; a delay occurring until an encoded image is streamed in a display device (or a decoding device); a delay occurring until a decoded image is actually displayed; and time information that is changed according to the encoding order associated with frames. The encoder 2201 may set the encoding-target part to be greater than the decoding-target part.

In step 2237, the encoder 2201 may determine whether to optimize the structure of an encoding area. For example, the encoder 2201 may determine variable block sizes by taking into consideration a decoding overhead, thereby optimizing the structure of the encoding area, in step 2239. For example, the encoder 2201 may determine a block size based on a quality-bit rate optimizing method. In step 2241, the encoder 2201 may perform encoding. In step 2243, the encoder 2201 may store an encoded image.

Figure 23:
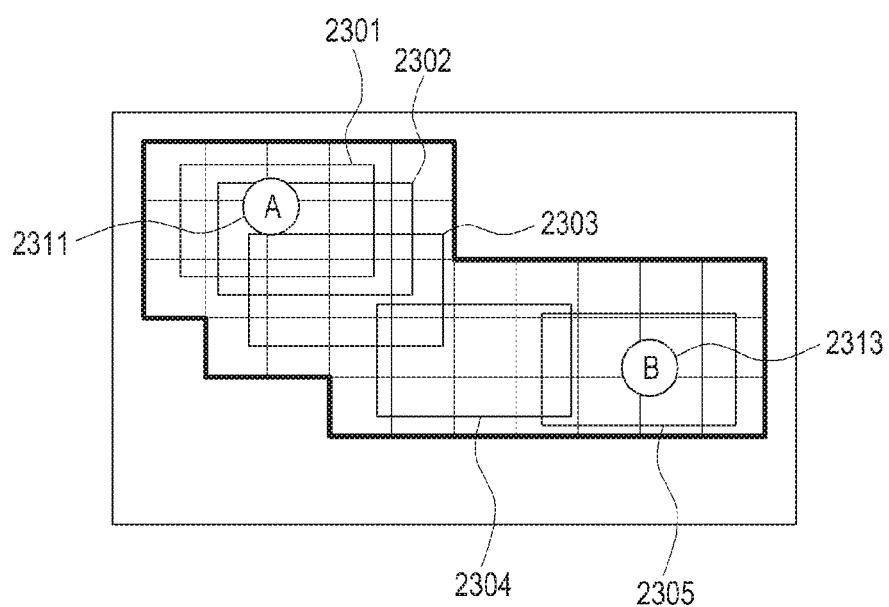
FIG. 23 illustrates assigning a resource with respect to a block according to an embodiment of the present disclosure.

FIG. 23 illustrates assigning a resource with respect to a block according to an embodiment of the present disclosure.

Referring to FIG. 23, the electronic device 101 may determine a part 2302 to 2305 corresponding to a future user gaze based on a part 2301 corresponding to a current user gaze. The electronic device 101 may determine an area 2311 where parts corresponding to user gazes overlap as a region of interest (ROI). The electronic device 101 may assign a relatively high resource to the ROI. The electronic device 101 may assign a relatively low resource to an area 2313 where parts corresponding to user gazes do not overlap. In addition, the electronic device 101 may assign a resource based on importance of an image or importance of an object in an image. If the electronic device 101 performs encoding, the electronic device 101 may perform encoding by assigning a greater resource to the area 2311 where parts corresponding to user gazes overlap.

Figure 24:
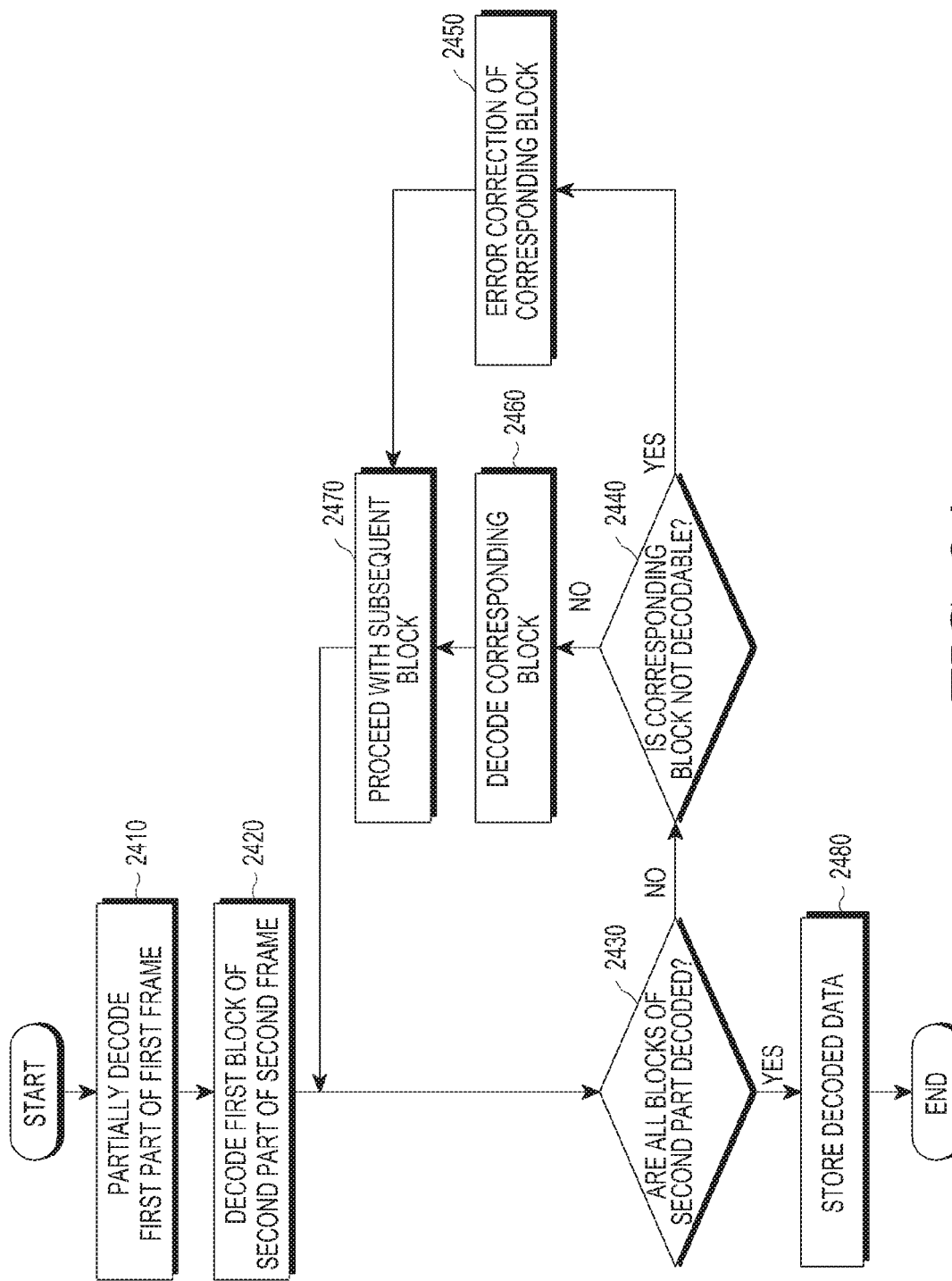
FIG. 24 is a flowchart of a method of controlling an electronic device according to an embodiment of the present disclosure.

FIG. 24 is a flowchart of a method of controlling an electronic device according to an embodiment of the present disclosure.

Referring to FIG. 24, in step 2410, the electronic device 101 may partially decode a first part of a first frame. As described above, the electronic device 101 may partially decode a part that includes a part corresponding to a user gaze and has a size greater than or equal to the part corresponding to the user gaze. In step 2420, the electronic device 101 may decode a first block of a second part of a second frame. The second part is also a part that is greater than or equal to a part corresponding to a user gaze on the second frame.

In step 2430, the electronic device 101 may determine whether all of the blocks in the second part are decoded. If all of the blocks are not decoded, the electronic device 101 may determine whether a corresponding block is not decodable in step 2440. For example, although the electronic device 101 determines a part that is greater than or equal to a part corresponding to a user gaze as a decoding-target area, a reference block in the first frame may not be decoded. In this case, the electronic device 101 may determine a block to which decoding, for example, inter-prediction, is currently performed, as a block that is not decodable. If it is determined that the block is not decodable, the electronic device 101 may perform error correction of the corresponding block in step 2450. If it is determined that the block is decodable, the electronic device 101 may decode the corresponding block in step 2460. In step 2470, the electronic device 101 may proceed with decoding of a subsequent block. If it is determined that all of the blocks are decoded, the electronic device 101 may store decoded data in step 2480. According to an embodiment of the present disclosure, the electronic device 101 may perform error correction using at least one of a predetermined constant value, a value selected among sample values of a unit of decoding (e.g., a block), and an average value of adjacent sample values of a unit of decoding (e.g., a block). Alternatively, the electronic device 101 may perform error correction using a down-sampled image included as additional information. Alternatively, the electronic device 101 may perform error correction based on various prediction methods associated with adjacent sample values of a unit of encoding (e.g., a block).

Figure 25:
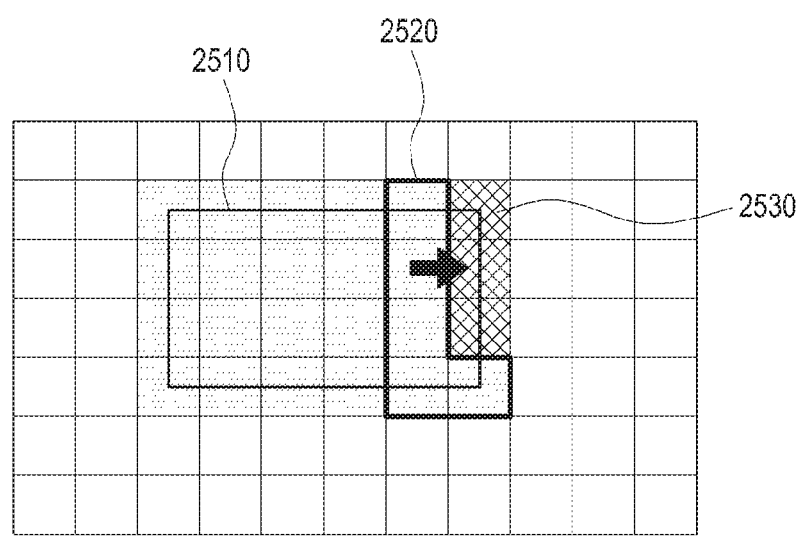
FIG. 25 illustrates a block error correction process according to an embodiment of the present disclosure.

FIG. 25 illustrates a block error correction process according to an embodiment of the present disclosure.

Referring to FIG. 25, the electronic device 101 may determine a part 2510 corresponding to a current user gaze in an entire image. To display the part corresponding to the current user gaze, the electronic device 101 must decode a first area 2530. Some blocks of the first area 2530 may not be decodable. For example, a reference block for inter-prediction of some blocks in the first area 2530 may not be decoded in a previous frame, or a reference block for intra-prediction of the some blocks in the first area 2530 may not be decoded in the entire image. The electronic device 101 may perform error correction with respect to a block that is not decodable. For example, the electronic device 101 may determine pixel information of the block in the first area 2530 that is not decodable, with reference to pixel information of a block 2520 adjacent to the block in the first area 2530 that is not decodable. Alternatively, the electronic device 101 may set the pixel information of the block in the first area 2530 that is not decodable, to a predetermined value. The occurrence of a block-based artifact (blocky artifact), which may occur during a block-based encoding-decoding process, may be suppressed by error correction. The error correction process may be selectively applied. In the case of a sample adaptive offset (SAO) of HEVC and a deblocking filter, a syntax may be defined to enable on/off setting using a flag. Accordingly, the electronic device 101 according to an embodiment of the present disclosure may selectively perform an error correction process using on/off control by a flag. The electronic device 101 may perform error correction of in-loop filtering. Alternatively, the electronic device 101 may perform error correction in a hole filling manner. In the method of FIG. 25, the electronic device 101 may perform error correction by estimating an intra-prediction direction using directivity of an adjacent pixel, and applying intra-prediction. The electronic device 101 may perform error correction using a method of using the above described internal function of a codec, or may use a hole-filling method defined in the computer vision field, such as an image-based rendering.

Figure 26:
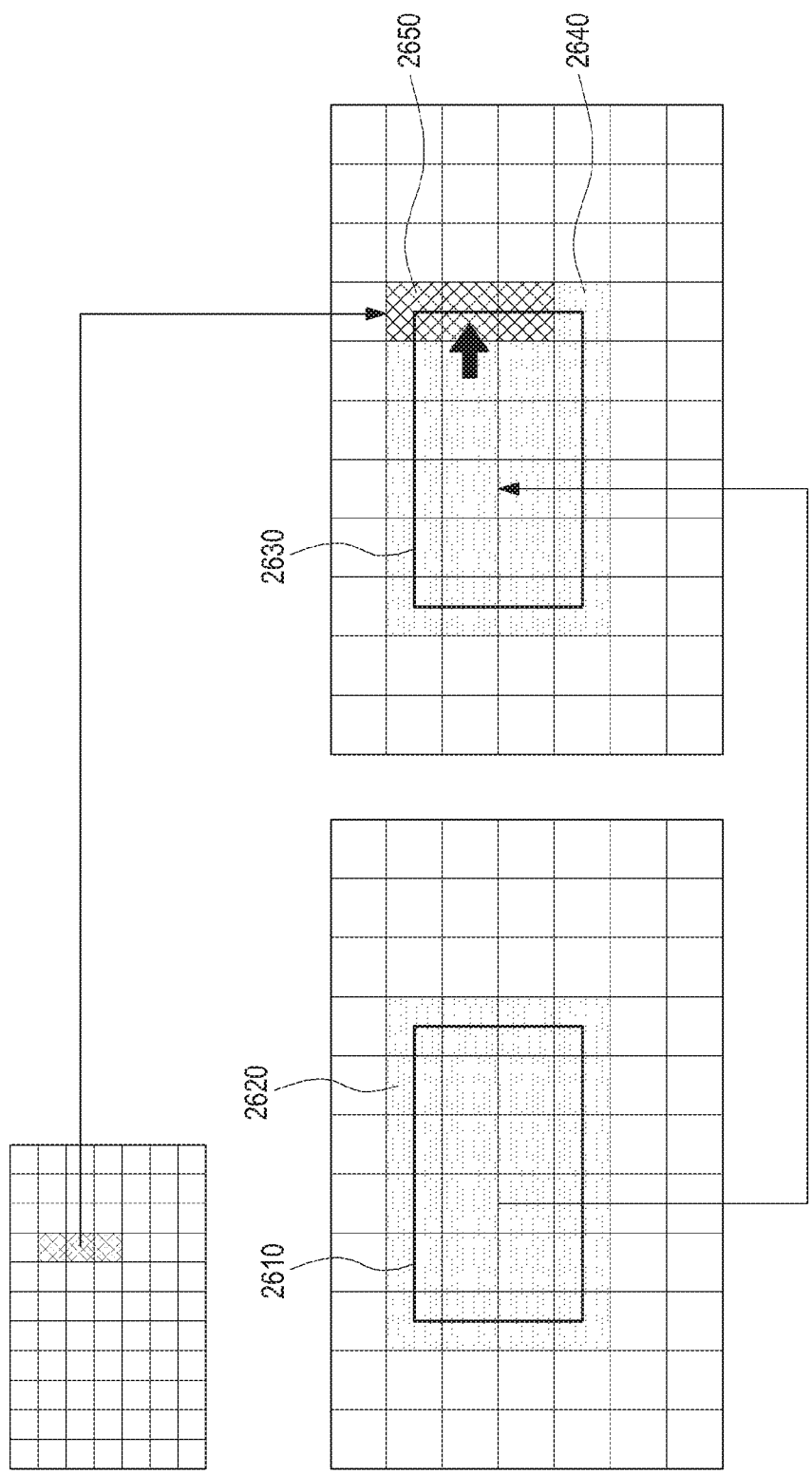
FIG. 26 illustrates an error correction process according to an embodiment of the present disclosure.

FIG. 26 illustrates an error correction process according to an embodiment of the present disclosure.

Referring to FIG. 26, the electronic device 101 may attempt to decode a part 2640 corresponding to a part 2630, which corresponds to a current user gaze, by using a block of a decoded part 2620 corresponding to a part 2610, which corresponds to a previous user gaze on a previous frame. The decoding-target part 2640 may include a block 2650 that is not decodable. In this case, the electronic device 101 may perform error correction with respect to the block 2650 that is not decodable, using error correction-related information. The error correction-related information may be stored in advance in an encoding file, and may include, for example, a down-sampled picture or metadata. The metadata may include, for example, gradient information associated with a pixel, an image database layer (IDB-layer) intra-prediction direction, down-sampled pixel information, or the like. If the metadata includes the gradient information, the electronic device 101 may perform error correction using a saliency map.

Figure 27:
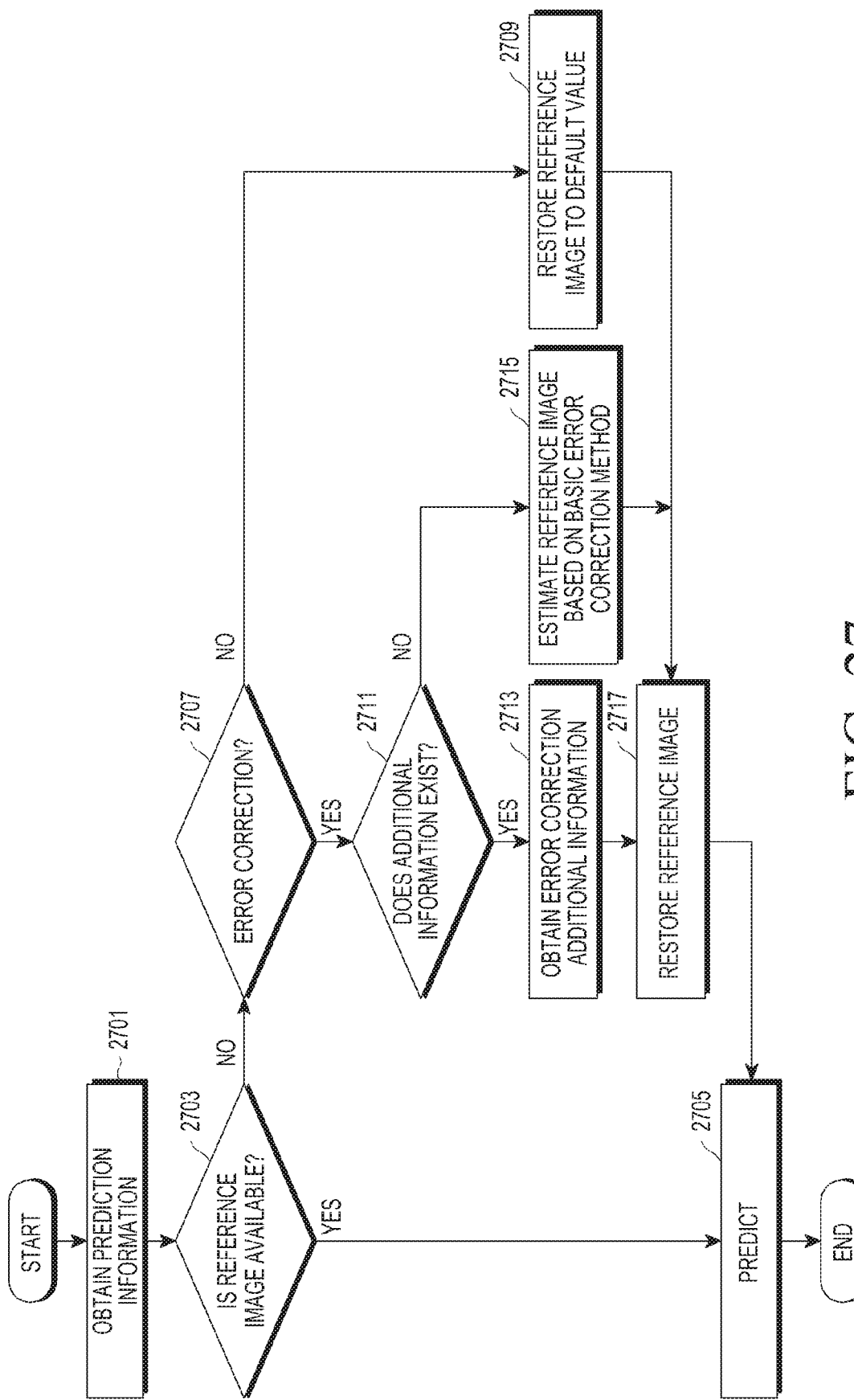
FIG. 27 is a flowchart of an error correction method according to an embodiment of the present disclosure.

FIG. 27 is a flowchart of a method of error correction according to an embodiment of the present disclosure.

Referring to FIG. 27, in step 2701, the electronic device 101 may obtain prediction information. The electronic device 101 may obtain prediction information for decoding a predetermined block. The prediction information may include, for example, information associated with a location of a reference block for inter-prediction in a previous frame, information associated with a location of a reference block for intra-prediction in a current frame, or the like.

In step 2703, the electronic device 101 may determine whether a reference image is available. For example, the electronic device 101 may determine whether a block corresponding to the location of the reference image is decoded in advance. If it is determined that the reference image is available, the electronic device 101 may predict and decode a current decoding-target block using the reference image in step 2705.

In step 2707, the electronic device 101 may determine whether to perform error correction. If the electronic device 101 determines not to perform error correction, the electronic device 101 may restore a reference image to a default value in step 2709. The default value may be a constant value, for example, the color black.

If the electronic device 101 determines to perform error correction, the electronic device 101 may determine whether additional information exists in step 2711. The additional information may be information for correcting errors. If the electronic device 101 determines that the additional information does not exist, the electronic device 101 may estimate a reference image based on a basic error correction method, as opposed to using the additional information, in step 2715.

If the electronic device 101 determines that the additional information exists, the electronic device 101 may obtain additional information for error correction in step 2713, and the electronic device 101 may estimate a reference image using the additional information. In step 2717, the electronic device 101 may restore the reference image. In step 2705, the electronic device 101 may obtain a predicted image using the reference image, and may perform partial-decoding using the same.

Figure 28:
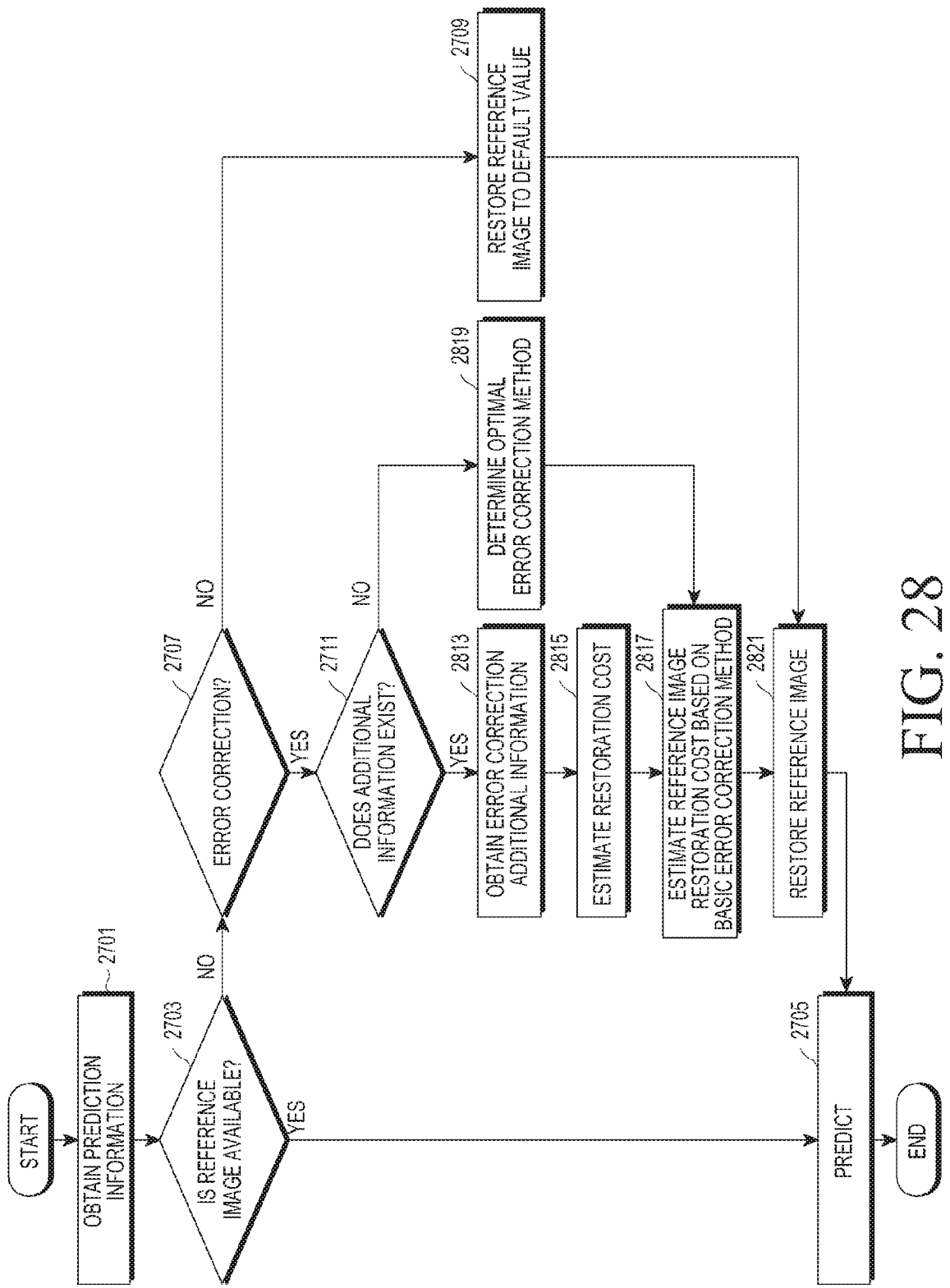
FIG. 28 is a flowchart of an error correction method according to an embodiment of the present disclosure.

FIG. 28 is a flowchart of a method of error correction according to an embodiment of the present disclosure. The description of a process described above with reference to FIG. 27 is omitted in the description of FIG. 28. FIG. 27 illustrates one type of additional information, whereas FIG. 28 illustrates a plurality of pieces of additional information.

Referring to FIG. 28, if it is determined that the additional information exists in step 2711, the electronic device 101 may obtain additional information for error correction in step 2813. In step 2815, the electronic device 101 may estimate the restoration cost associated with the additional information for error correction. As described above, a plurality of pieces of additional information may exist. The electronic device 101 may estimate a cost of each piece of additional information. The cost of additional information may include information associated with a resource expended for performing error correction using additional information, information associated with accuracy if error correction is performed using additional information, or the like.

In step 2819, the electronic device 101 may determine an optimal error correction method. The electronic device 101 may determine optimal error correction additional information using the estimated cost. For example, the electronic device 101 may determine additional information that requires the least amount of resources for processing, as the optimal additional information for error correction. Alternatively, the electronic device 101 may determine additional information having the greatest accuracy as the optimal additional information for error correction. Alternatively, the electronic device 101 may determine the optimal additional information for error correction by taking into consideration a currently available resource. In step 2817, the electronic device 101 may estimate a reference image based on the determined optimal error correction method. If additional information does not exist, the electronic device 101 may estimate a reference image restoration cost based on a basic error correction method in step 2817, and may determine the optimal error correction method in step 2819.

Figure 29:
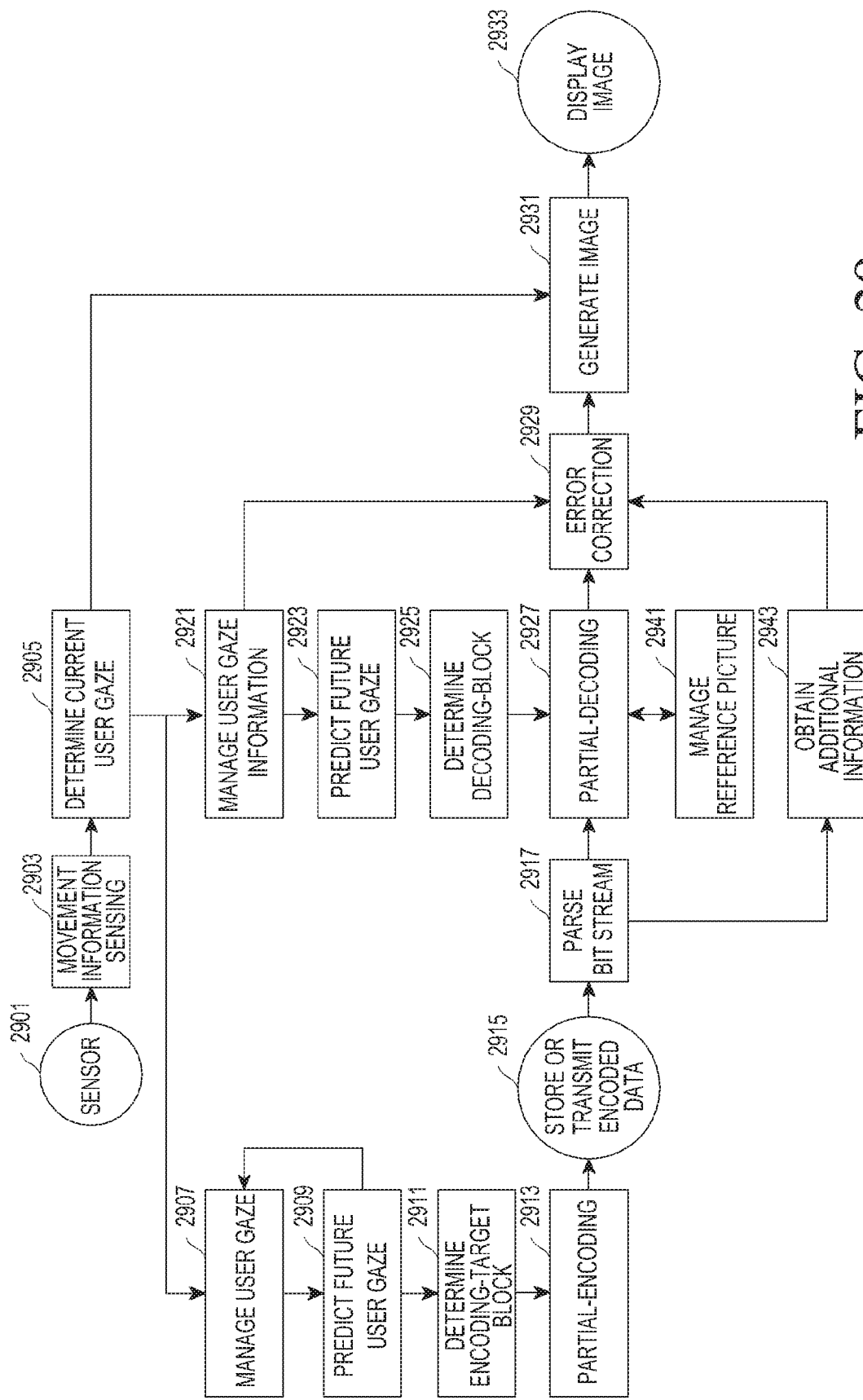
FIG. 29 is a flowchart of a method of operation of an electronic device according to an embodiment of the present disclosure.

FIG. 29 is a flowchart of a method of the electronic device 101, according to an embodiment of the present disclosure.

Referring to FIG. 29, the electronic device 101, for example, a sensor 2901, may sense movement information in step 2903. In step 2905, the electronic device 101 may determine a current user gaze (view point) using the movement information. A server may receive a user gaze, and may manage the received user gaze in step 2907. The server may manage user state information and user gaze information at a current time. As described above, the user state information may include accumulated data associated with gaze information or another piece of information. If the server is synchronized with the electronic device 101, the server may not separately manage a user gaze. In step 2909, the server may predict a future user gaze. In step 2911, the server may determine an encoding-target block using the future user gaze. The server may partially encode the determined encoding-target block in step 2913, and the server may store the same or may transmit the same to the electronic device 101 in step 2915. The server may encode the determined encoding-target block in variable block sizes.

In step 2917, the electronic device 101 may parse a received bit stream. The electronic device 101 may obtain additional information for error correction through parsing. In step 2921, the electronic device 101 may manage information associated with a user gaze. In step 2923, the electronic device 101 may predict a future user gaze. In step 2925, the electronic device 101 may determine a decoding-target block based on the future user gaze. In step 2927, the electronic device 101 may perform partial-decoding with respect to each frame that is parsed from the received bit stream. In step 2941, the electronic device 101 may manage a reference picture, and the electronic device 101 may perform partial-decoding using the reference picture. In step 2943, the electronic device 101 may manage additional information obtained through parsing. In step 2929, the electronic device 101 may perform error correction using or without using the additional information. The electronic device 101 may generate an image associated with the current user gaze in step 2931, and may display the generated image in step 2933.

Figure 30:
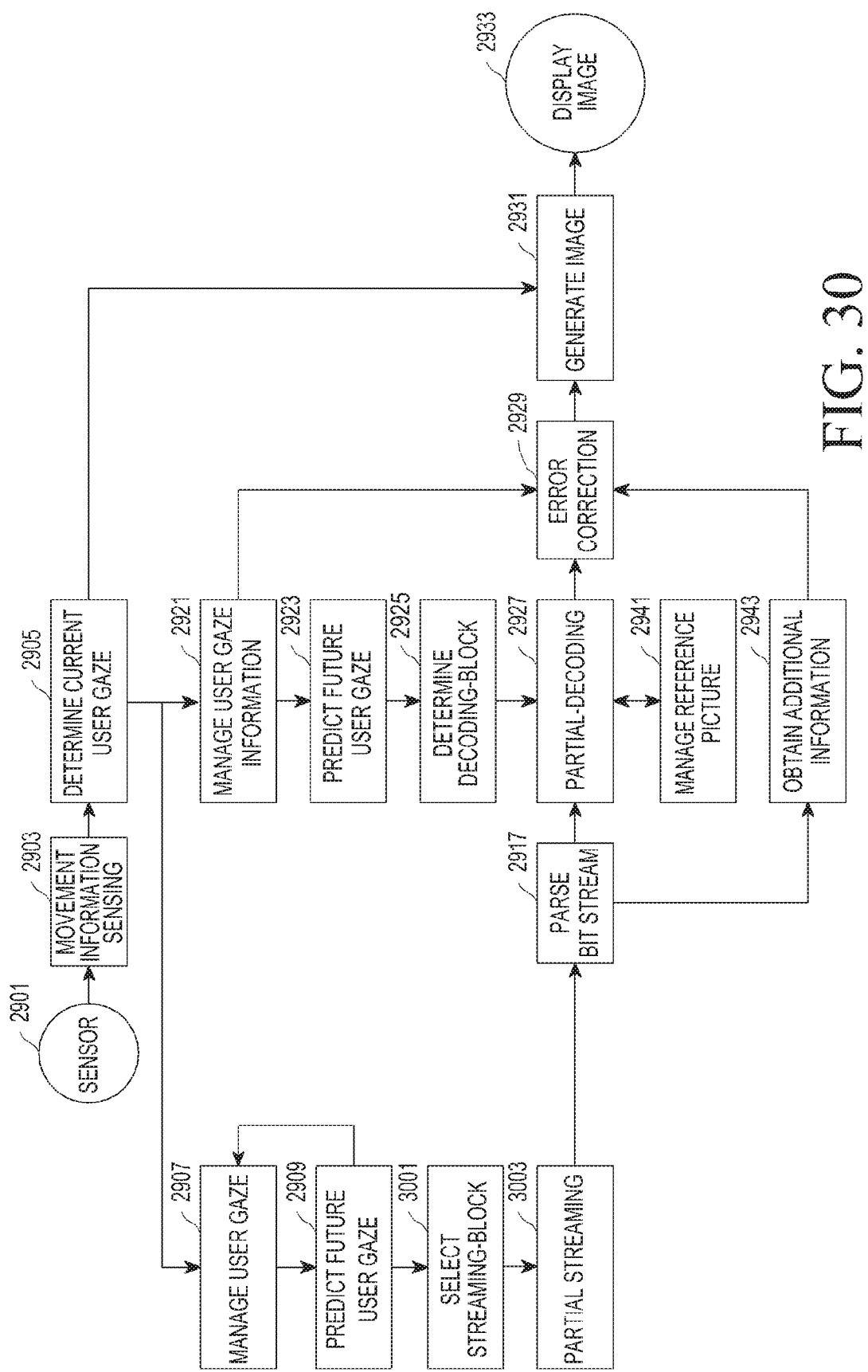
FIG. 30 is a flowchart of a control method of an electronic device according to an embodiment of the present disclosure.

FIG. 30 is a flowchart of a control method of an electronic device according to an embodiment of the present disclosure. The description above of the steps illustrated in FIG. 29 are omitted in the description below of the steps of FIG. 30.

Referring to FIG. 30, in step 3001, a server may select a streaming block. As described above, the server may select a part to which partial-encoding is to be performed based on a part corresponding to a current user gaze and a part corresponding to a future user gaze, and may select, as a streaming block, a block to be used for transmitting the part to which the partial-encoding is to be performed. In step 3003, the server performs partial-encoding, and may stream only the encoded part. The server may perform rate-distortion optimization in a range setting process.

Figure 31:
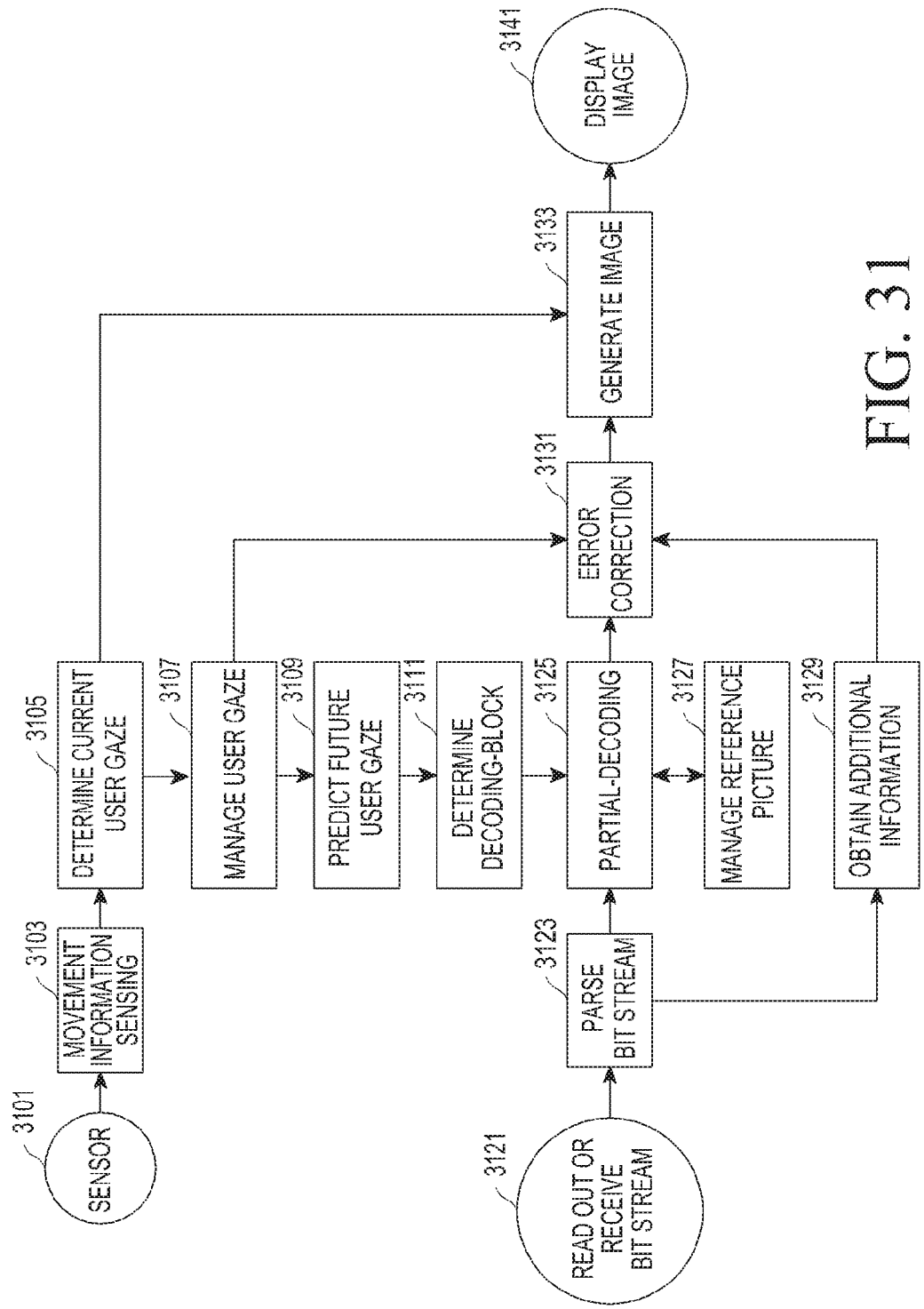
FIG. 31 is a flowchart of a control method of an electronic device according to an embodiment of the present disclosure.

FIG. 31 is a flowchart of a control method of the electronic device 101 according to an embodiment of the present disclosure.

Referring to FIG. 31, the electronic device 101, for example, a sensor 3101, may sense movement information in step 3103. In step 3105, the electronic device 101 may determine a current user gaze (view point) using the movement information. In step 3107, the electronic device 101 may manage the received user gaze. In step 3109, the electronic device 101 may predict a future user gaze. In step 3111, the electronic device 101 may determine a decoding-target block based on the future user gaze. In step 3121, the electronic device 101 may read out a previously stored bit stream or may receive a bit stream through a communication module. The electronic device 101 may parse the bit stream in step 3123, and for example, may obtain additional information for error correction in step 3129. In step 3125, the electronic device 101 may perform partial-decoding. For example, the electronic device 101 may manage a reference picture in step 3127, and may use the reference picture in a partial-decoding process. In step 3131, the electronic device 101 may perform error correction. In step 3133, the electronic device 101 may generate an image corresponding to the current user gaze using the user gaze and error-corrected data. In step 3141, the electronic device 101 may display an image.

According to an embodiment of the present disclosure, a control method of an electronic device may include obtaining a video; determining a part corresponding to a user gaze on a first frame in the first frame of the video; determining a decoding-target part, which includes the part corresponding to the user gaze on the first frame and has a size greater than or equal to the part corresponding to the user gaze on the first frame; decoding the decoding-target part; and displaying an image of the part corresponding to the user gaze on the first frame among the decoding-target part.

According to an embodiment of the present disclosure, the step of determining the decoding-target part may include predicting a user gaze on at least one frame after the first frame; determining, from the first frame, a part corresponding to the user gaze on the at least one frame after the first frame; and determining the decoding-target part including the part corresponding to the user gaze on the first frame and the part corresponding to the user gaze on the at least one frame after the first frame.

According to an embodiment of the present disclosure, the step of determining the decoding-target part may include determining, as the decoding-target part, an additional part including a predetermined number of pixels from a boundary of the part corresponding to the user gaze on the first frame and the part corresponding to the user gaze on the at least one frame after the first frame, together with the part corresponding to the user gaze on the first frame and the part corresponding to the user gaze on the at least one frame after the first frame. The predetermined number is variable based on reliability of the user gaze on the at least one frame after the first frame.

According to an embodiment of the present disclosure, the control method of the electronic device may further include determining a part corresponding to a user gaze on a second frame of the video; decoding the part corresponding to the user gaze on the second frame; and displaying an image associated with the part corresponding to the user gaze on the second frame.

According to an embodiment of the present disclosure, the step of decoding the part corresponding to the user gaze on the second frame may include predicting at least one block of the part corresponding to the user gaze on the second frame from at least one block of the decoding-target part of the first frame.

According to an embodiment of the present disclosure, the step of decoding the part corresponding to the user gaze on the second frame may include determining a decoding-target part of the second frame, which includes the part corresponding to the user gaze on the second frame and has a size greater than or equal to the part corresponding to the user gaze on the second frame; and decoding the decoding-target part of the second frame.

According to an embodiment of the present disclosure, the control method of the electronic device may further include if it is determined that at least one block in the decoding-target part of the second frame is not decodable, performing error correction with respect to the at least one block which is not decodable.

According to an embodiment of the present disclosure, the step of predicting the user gaze on the at least one frame after the first frame may include predicting the future user gaze based on at least one of sensing data from a sensor of the electronic device, a behavioral habit of a user of the electronic device, and information associated with content of the video.

According to an embodiment of the present disclosure, the step of decoding the decoding-target part may include decoding a first block of the decoding-target part independently; and predicting a second block of the decoding-target part by referring to the first block, wherein the first block is not included in the part corresponding to the user gaze on the first frame and the second block is included in the part corresponding to the user gaze on the first frame.

According to an embodiment of the present disclosure, a control method of an electronic device that performs encoding may include obtaining a video including a wide-angle image for providing a virtual reality service; receiving information associated with a current user gaze from the electronic device that performs decoding; determining a part corresponding to a user gaze on the first frame using the current user gaze, from the first frame of the video; determining an encoding-target part, which includes the part corresponding to the user gaze on the first frame and has a size greater than or equal to the part corresponding to the user gaze on the first frame; encoding the encoding-target part; and transmitting encoded data to the electronic device that performs decoding.

According to an embodiment of the present disclosure, determining the encoding-target part may include determining the encoding-target part including the part corresponding to the user gaze on the first frame and a part corresponding to a user gaze on at least one frame after the first frame.

According to an embodiment of the present disclosure, the step of determining the encoding-target part may include determining, as the encoding-target part, an additional part including a predetermined number of pixels from a boundary of the part corresponding to the user gaze on the first frame and the part corresponding to the user gaze on the at least one frame after the first frame, together with the part corresponding to the user gaze on the first frame and the part corresponding to the future user gaze. The encoding-target part may include a plurality of blocks, and the sizes of the plurality of blocks may be the same as or different from one another.

According to an embodiment of the present disclosure, the step of determining the part corresponding to the user gaze on the first frame may include determining the part corresponding to the user gaze on the first frame by taking into consideration a delay between a time if the encoding is performed and a time if displaying is performed in the electronic device that performs decoding.

The term "module" as used herein may, for example, indicate a unit including one of hardware, software, and firmware or a combination of two or more of them. The term "module" may be interchangeably used with, for example, the terms "unit", "logic", "logical block", "component", or "circuit". The term "module" may indicate the smallest unit of an integrated component or a part thereof. The term "module" may indicate the smallest unit that performs one or more functions or a part thereof. The term "module" may indicate a device that may be mechanically or electronically implemented. For example, the term "module" according to the present disclosure may include at least one of an ASIC, an FPGA, and a programmable-logic device for performing steps which are known or will be developed.

According to an embodiment of the present disclosure, at least some of the devices (for example, modules or functions thereof) or the method (for example, steps) may be implemented by a command stored in a non-transitory computer-readable storage medium in a programming module form. If the command is executed by one or more processors (for example, the processor 120 in FIG. 1), the one or more processors may execute a function corresponding to the command. The non-transitory computer-readable storage medium may, for example, be the memory 130 in FIG. 1.

The non-transitory computer-readable storage medium may include a hard disk, a floppy disk, magnetic media (e.g., a magnetic tape), optical media (e.g., a CD-ROM and a DVD), magneto-optical media (e.g., a floptical disk), a hardware device (e.g., a ROM, a random access memory (RAM), a flash memory), and the like. In addition, the program instructions may include high level language code, which may be executed in a computer by using an interpreter, as well as machine code generated by a compiler. The aforementioned hardware device may be configured to operate as one or more software modules in order to perform the operation of the present disclosure, and vice versa.

The programming module according to an embodiment of the present disclosure may include one or more of the aforementioned components or may further include other additional components, or some of the aforementioned components may be omitted. Steps executed by a module, a programming module, or other component elements according to an embodiment of the present disclosure may be executed sequentially, in parallel, repeatedly, or in a heuristic manner. Furthermore, some steps may be executed in a different order or may be omitted, or other steps may be added.

According to an embodiment of the present disclosure of the present disclosure, there is provided a storage medium storing instructions, wherein the instructions are configured to enable at least one processor to perform at least one step if the instructions are executed by the at least one processor, and the at least one step includes obtaining a video including wide-angle images for providing a virtual reality service; determining a part corresponding to a user gaze on a first frame in the first frame of the video; determining a decoding-target part, which includes the part corresponding to the user gaze on the first frame and has a size greater than or equal to the part corresponding to the user gaze on the first frame; decoding the decoding-target part; and displaying a left eye image and a right eye image of the part corresponding to the user gaze on the first frame among the decoding-target part.

Various embodiments disclosed herein are provided merely to easily describe technical details of the present disclosure and to facilitate understanding of the present disclosure, but are not intended to limit the scope of the present disclosure. Therefore, it is intended that all modifications and changes or modified and changed forms based on the present disclosure fall within the scope of the present disclosure, as defined by the appended claims and their equivalents.

What is claimed is:

1. A control method of an electronic device, the method comprising:
    obtaining a video;
    detecting a user gaze based on information on a direction on which the electronic device is tilted;
    determining a part of a first frame of the video corresponding to the detected user gaze;
    predicting a user gaze in at least one frame after the first frame;
    determining, from the first frame, a part corresponding to the predicted user gaze in the at least one frame after the first frame;
    determining a decoding-target part in the first frame, the decoding-target part including the part of the first frame corresponding to the detected user gaze, the part corresponding to the predicted user gaze in the at least one frame after the first frame, and an additional part including pixels of a predetermined number from a boundary of the part of the first frame corresponding to the detected user gaze and a boundary of the part corresponding to the predicted user gaze in the at least one frame after the first frame;
    decoding the decoding-target part; and
    displaying an image of the part of the first frame corresponding to the detected user gaze among the decoding-target part.

2. The method of claim 1, wherein the predetermined number of pixels is variable based on a reliability of the predicted user gaze in the at least one frame after the first frame.

3. The method of claim 1, further comprising:
    determining a part corresponding to a user gaze in a second frame of the video;
    decoding the part corresponding to the user gaze in the second frame; and
    displaying an image associated with the part corresponding to the user gaze in the second frame.

4. The method of claim 3, wherein decoding the part corresponding to the user gaze in the second frame comprises:
    predicting at least one block of the part corresponding to the user gaze in the second frame from at least one block of the decoding-target part of the first frame.

5. The method of claim 3, wherein decoding the part corresponding to the user gaze in the second frame comprises:
    determining a decoding-target part of the second frame, which includes the part corresponding to the user gaze in the second frame and has a size greater than or equal to the part corresponding to the user gaze in the second frame; and
    decoding the decoding-target part of the second frame.

6. The method of claim 5, further comprising:
    if it is determined that at least one block in the decoding-target part of the second frame is not decodable, performing error correction with respect to the at least one block which is not decodable.

7. The method of claim 1, wherein predicting the user gaze in the at least one frame after the first frame comprises:
    predicting the user gaze in the at least one frame after the first frame based on at least one of sensing data from a sensor of the electronic device, a behavioral habit of a user of the electronic device, and information associated with content of the video.

8. The method of claim 1, wherein decoding the decoding-target part comprises:
    decoding a first block of the decoding-target part independently; and
    predicting a second block of the decoding-target part by referring to the first block,
    wherein the first block is not included in the part corresponding to the detected user gaze in the first frame and the second block is included in the part corresponding to the detected user gaze in the first frame.

9. The method of claim 8, further comprising:
    if it is determined that at least one block in the decoding-target part of the first frame is not decodable, performing error correction with respect to the at least one block that is not decodable.

10. An electronic device, comprising:
a display; and
a processor configured to:
obtain a video;
detect a user gaze based on information on a direction on which the electronic device is tilted;
determine a part of a first frame of the video corresponding to the detected user gaze;
predict a user gaze in at least one frame after the first frame;
determine, from the first frame, a part corresponding to the predicted user gaze in the at least one frame after the first frame;
determine a decoding-target part in the first frame, the decoding-target part including the part of the first frame corresponding to the detected user gaze, the part corresponding to the predicted user gaze in the at least one frame after the first frame, and an additional part including a predetermined number of pixels from a boundary of the part of the first frame corresponding to the detected user gaze and a boundary of the part corresponding to the predicted user gaze in the at least one frame after the first frame;
decode the decoding-target part; and
display, on the display, an image associated with the part of the first frame corresponding to the detected user gaze among the decoding-target part.

11. The electronic device of claim 10, wherein the processor is further configured to:
predict the user gaze in the at least one frame after the first frame based on at least one of sensing data from a sensor of the electronic device, a behavioral habit of a user of the electronic device, and information associated with content of the video.

12. The electronic device of claim 10, wherein the processor is further configured to:
decode a first block of the decoding-target part independently; and
predict a second block of the decoding-target part by referring to the first block,
wherein the first block is not included in the part corresponding to the user gaze in the first frame and the second block is included in the part corresponding to the user gaze in the first frame.

13. A control method of an electronic device that performs encoding, the method comprising:
obtaining a video including a wide-angle image for providing a virtual reality service;
receiving information associated with a current user gaze from an electronic device that performs decoding;
determining a part of a first frame of the video corresponding to the current user gaze;
predicting a user gaze in at least one frame after the first frame;
determining, from the first frame, a part corresponding to the predicted user gaze in the at least one frame after the first frame;
determining an encoding-target part in the first frame, the encoding-target part including the part of the first frame corresponding to the current user gaze, the part corresponding to the predicted user gaze in the at least one frame after the first frame, and an additional part including a predetermined number of pixels from a boundary of the part of the first frame corresponding to the user gaze and the part corresponding to the predicted user gaze in the at least one frame after the first frame;
encoding the encoding-target part; and
transmitting encoded data to the electronic device that performs decoding.

14. The method of claim 13, wherein determining the encoding-target part comprises:
determining the encoding-target part including the part corresponding to the user gaze in the first frame and a part corresponding to a user gaze in at least one frame after the first frame.

15. The method of claim 13, wherein the encoding-target part includes a plurality of blocks, and the sizes of the plurality of blocks are identical to or different from one another.

16. The method of claim 13, wherein determining the part corresponding to the user gaze in the first frame comprises:
determining the part corresponding to the user gaze in the first frame by considering a delay between a time when encoding is performed and a time when displaying is performed in the electronic device that performs decoding.

* * * * *